United States Patent
Wu et al.

(10) Patent No.: US 12,273,344 B2
(45) Date of Patent: Apr. 8, 2025

(54) COMMUNICATION METHOD, APPARATUS, AND SYSTEM

(71) Applicant: Huawei Technologies Co., Ltd., Shenzhen (CN)

(72) Inventors: Rong Wu, Shenzhen (CN); He Li, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 475 days.

(21) Appl. No.: 17/674,607

(22) Filed: Feb. 17, 2022

(65) Prior Publication Data
US 2022/0174063 A1  Jun. 2, 2022

Related U.S. Application Data

(63) Continuation of application No. PCT/CN2019/101243, filed on Aug. 18, 2019.

(51) Int. Cl.
*G06F 21/00* (2013.01)
*H04L 9/40* (2022.01)

(52) U.S. Cl.
CPC .......... *H04L 63/0884* (2013.01); *H04L 63/06* (2013.01)

(58) Field of Classification Search
CPC ................ H04L 63/0884; H04L 63/06; H04L 9/0844; H04L 9/3273; H04W 12/043; H04W 12/069
See application file for complete search history.

(56) References Cited

U.S. PATENT DOCUMENTS

| 2017/0150355 A1 | 5/2017 | Bergius et al. |
| 2018/0192289 A1 | 7/2018 | Dao |

(Continued)

FOREIGN PATENT DOCUMENTS

| CN | 101772020 A | 7/2010 |
| CN | 108347729 A | 7/2018 |

(Continued)

OTHER PUBLICATIONS

"3rd Generation Partnership Project; Technical Specification Group Services and System Aspects;Study on authentication and key management for applications;based on 3GPP credential in 5G (Release 16)," 3GPP TR 33.835 V0.5.0, total 91 pages, 3rd Generation Partnership Project, Valbonne, France (Jun. 2019).

(Continued)

*Primary Examiner* — Kendall Dolly
(74) *Attorney, Agent, or Firm* — Leydig, Voit & Mayer, Ltd.

(57) ABSTRACT

A communication method, apparatus, and system are provided, to resolve problems in a conventional technology that an AKMA authentication procedure is complex and signaling overheads are large. Principles of the method are as follows: In a registration procedure of a terminal device, AKMA authentication is implicitly indicated based on primary authentication. For example, if primary authentication succeeds, it may be considered that AKMA authentication also succeeds. In addition, an AKMA temporary identifier is allocated to the terminal device after AKMA authentication succeeds. According to the method, apparatus, and system in this application, no additional AKMA authentication is required. This simplifies a procedure and reduces signaling overheads.

20 Claims, 13 Drawing Sheets

(56) References Cited

U.S. PATENT DOCUMENTS

| | | | |
|---|---|---|---|
| 2020/0186526 A1* | 6/2020 | Li | H04L 63/102 |
| 2022/0150696 A1* | 5/2022 | Rajadurai | H04W 12/041 |
| 2022/0174063 A1* | 6/2022 | Wu | H04W 12/043 |
| 2022/0377540 A1* | 11/2022 | Deng | H04L 63/061 |
| 2023/0019089 A1* | 1/2023 | Li | H04W 12/041 |
| 2023/0024999 A1* | 1/2023 | Wu | H04W 12/0433 |
| 2023/0086032 A1* | 3/2023 | Guo | H04L 67/141 |
| | | | 713/171 |
| 2023/0319561 A1* | 10/2023 | Natarajan | H04W 12/0433 |
| | | | 455/411 |
| 2023/0362636 A1* | 11/2023 | Li | H04W 12/0431 |
| 2024/0284377 A1* | 8/2024 | Tiwari | H04W 48/18 |

FOREIGN PATENT DOCUMENTS

| | | |
|---|---|---|
| CN | 108738019 A | 11/2018 |
| CN | 109413646 A | 3/2019 |
| CN | 109842880 A | 6/2019 |
| TW | 201246923 A | 11/2012 |
| WO | 2018141269 A1 | 8/2018 |
| WO | 2019137547 A1 | 7/2019 |

OTHER PUBLICATIONS

Huawei, HiSilicon, "Architecture solution for AKMA with non-standalone function," 3GPP TSG SA WG3 (Security) Meeting #94, Kochi (India), S3-190197, total 4 pages, 3rd Generation Partnership Project, Valbonne, France (Jan. 28-Feb. 1, 2019).

Huawei, Hisilicon, "Solution for AKMA push," 3GPP TSG-SA WG3 Meeting #95-BIS, Sapporo (Japan), S3-192160, total 4 pages, 3rd Generation Partnership Project, Valbonne, France (Jun. 24-28, 2019).

"3rd Generation Partnership Project; Technical Specification Group Services and System Aspects; Security architecture and procedures for 5G system (Release 15)," 3GPP TS 33.501 V15.5.0, total 190 pages, 3rd Generation Partnership Project, Valbonne, France (Jun. 2019).

Ericsson, "Solution #15 updates including evaluation update," 3GPP TSG-SA WG3 Meeting #95Bis, Sapporo(Japan), S3-192002, XP051752947A, total 7 pages, 3rd Generation Partnership Project, Valbonne, France (Jun. 24-28, 2019).

* cited by examiner

COMMUNICATION METHOD, APPARATUS, AND SYSTEM

CROSS-REFERENCE TO RELATED APPLICATIONS

This application is a continuation of International Application No. PCT/CN2019/101243, filed on Aug. 18, 2019, the disclosure of which is hereby incorporated by reference in its entirety.

TECHNICAL FIELD

Embodiments of this application relate to the field of communication technologies, and in particular, to a communication method, apparatus, and system.

BACKGROUND

Currently, terminal devices may support authentication and key management for applications (AKMA) services. AKMA authentication is usually performed on a terminal device in the following manner: After the terminal device is successfully registered and primary authentication is completed, additional AKMA authentication is performed on the terminal device. An AKMA authentication procedure is complex, incurring large signaling overheads.

SUMMARY

Embodiments of this application provide a communication method, apparatus, and system, to simplify an AKMA authentication procedure and reduce signaling overheads.

According to a first aspect, a communication method is provided. The method includes: A terminal device sends a registration request message to a mobility management network element.

After authentication succeeds in a primary authentication procedure and non-access stratum NAS security protection is activated, the terminal device receives a NAS-security-protected registration response sent by the mobility management network element. The registration response includes an authentication and key management for applications AKMA temporary identifier of the terminal device. The terminal device stores the AKMA temporary identifier.

According to the foregoing method, AKMA authentication is completed in the registration procedure of the terminal device, and no additional AKMA authentication needs to be performed. This simplifies an AKMA authentication procedure and reduces signaling overheads.

In a possible design, the AKMA temporary identifier includes a random value, a home network identifier, and a routing indicator. The random value, allocated by a network device, is a parameter identifying the terminal device, the home network identifier indicates a home network of the terminal device, and the routing indicator is used to determine a network function entity generating a key Kakma for an AKMA service.

In an embodiment of this application, the AKMA temporary identifier received by the terminal device includes not only identification information of the terminal device, but also information used to determine the network function entity generating the key Kakma for the AKMA service corresponding to the terminal device. When the terminal device subsequently accesses an AKMA application function network element by using the AKMA temporary identifier, an AKMA authentication function network element on a network side may determine, based on the AKMA temporary identifier, the network function entity generating the key Kakma for the AKMA service corresponding to the terminal device; further obtain the Kakma; and allocate, to the AKMA application function network element based on the obtained Kakma, a communication key for communicating between the AKMA application function network element and the terminal device.

In a possible design, the AKMA temporary identifier further includes at least one of address information of the AKMA authentication function network element or address information of the AKMA application function network element.

According to the foregoing method, a plurality of AKMA authentication function network elements and a plurality of AKMA application function network elements providing a same application service may exist in a network. After AKMA authentication succeeds (after primary authentication succeeds in this embodiment of this application), when the temporary identifier is allocated to the terminal device, address information of an appropriate AKMA authentication function network element or an appropriate AKMA application function network element may be allocated to the terminal device depending on a specific factor, and their address information is carried in the AKMA temporary identifier, so that the terminal device subsequently determines the appropriate AKMA application function network element based on the AKMA temporary identifier, or the AKMA application function network element subsequently determines the appropriate AKMA authentication function network element based on the AKMA temporary identifier.

In a possible design, the network function entity generating the key Kakma for the AKMA service is an authentication server function network element.

According to a second aspect, a communication method is provided. The method includes: An authentication server function network element receives, in a registration procedure of a terminal device, first indication information sent by a unified data management network element. The first indication information indicates that the terminal device supports an authentication and key management for applications AKMA service. The authentication server function network element determines an AKMA temporary identifier of the terminal device after primary authentication on the terminal device succeeds. The authentication server function network element sends the AKMA temporary identifier to the terminal device via a mobility management network element.

In an embodiment of this application, when the terminal device supports the AKMA service, if primary authentication on the terminal device succeeds, it is considered that AKMA authentication succeeds, and no AKMA authentication needs to be performed on the terminal device in an additional AKMA authentication procedure. Because no additional AKMA authentication needs to be performed, this simplifies an AKMA authentication procedure and reduces signaling overheads.

In a possible design, the AKMA temporary identifier includes a random value, a home network identifier, and a routing indicator. The random value, allocated by a network device, is a parameter identifying the terminal device, the home network identifier indicates a home network of the terminal device, and the routing indicator is used to determine a network function entity generating a key Kakma for the AKMA service.

In a possible design, the AKMA temporary identifier further includes at least one of address information of an AKMA authentication function network element or address information of an AKMA application function network element.

In a possible design, that the authentication server function network element determines the AKMA temporary identifier includes:

generating, by the authentication server function network element, the AKMA temporary identifier.

In a possible design, that the authentication server function network element determines the AKMA temporary identifier includes: sending, by the authentication server function network element, a first request message to the AKMA authentication function network element, where the first request message is used to request the AKMA authentication function network element to generate the AKMA temporary identifier; and receiving, by the authentication server function network element, a first response message sent by the AKMA authentication function network element, where the first response message carries the AKMA temporary identifier.

The AKMA authentication function network element generates the AKMA temporary identifier in a conventional technology. Therefore, the method is highly compatible with that in the conventional technology, and a small change is made.

In a possible design, that the authentication server function network element determines the AKMA temporary identifier includes: determining, by the authentication server function network element, the AKMA temporary identifier based on first auxiliary information. The first auxiliary information includes at least one of slice information of the terminal device, data network name information of the terminal device, or service and session continuity mode information of the terminal device.

According to the foregoing method, the AKMA temporary identifier includes the address information of the AKMA authentication function network element. In this embodiment of this application, different AKMA authentication function network elements may be selected based on different first auxiliary information. This improves flexibility of selecting an AKMA authentication function network element.

In a possible design, the method further includes: The authentication server function network element sends a second request message to the mobility management network element. The second request message carries the first indication information. The authentication server function network element receives a second response message sent by the mobility management network element. The second response message carries the first auxiliary information.

In a possible design, the method further includes: The authentication server function network element receives a third request message sent by the AKMA authentication function network element. The third request message carries the AKMA temporary identifier. The authentication server function network element obtains a first key based on the AKMA temporary identifier. The first key is an intermediate key generated in the primary authentication procedure. The authentication server function network element generates the key Kakma for the AKMA service based on the first key. The authentication server function network element sends the Kakma to the AKMA authentication function network element.

In a possible design, the method further includes: After primary authentication on the terminal device succeeds, the authentication server function network element stores a correspondence between the AKMA temporary identifier, an identifier of the terminal device, and the first key. That the authentication server function network element obtains a first key based on the AKMA temporary identifier includes: obtaining, by the authentication server function network element, the first key based on the AKMA temporary identifier and the correspondence.

In a possible design, the first key is Kausf.

In a possible design, when the AKMA temporary identifier includes the address information of the AKMA authentication function network element, the method further includes: The authentication server function network element updates the address information of the AKMA authentication function network element in the AKMA temporary identifier from first address information to second address information. The first address information is address information of a first AKMA authentication function network element, and the second address information is address information of a second AKMA authentication function network element.

According to a third aspect, a communication method is provided. The method includes: A unified data management network element receives, in a registration procedure of a terminal device, a third request message sent by an authentication server function network element. The third request message includes an identifier of the terminal device. The unified data management network element determines, based on subscription data of the terminal device, that the terminal device supports an authentication and key management for applications AKMA service. The unified data management network element sends a third response message to the authentication server function network element. The third response message includes first indication information, and the first indication information indicates that the terminal device supports the AKMA service.

In a possible design, the third request message is a UDM service-based request message used for obtaining of an authentication vector, and the third response message is a UDM service-based response message used for obtaining of the authentication vector.

According to a fourth aspect, a communication method is provided. The method includes: A first authentication and key management for applications AKMA authentication function network element receives, in a registration procedure of a terminal device, a fourth request message sent by an authentication server function network element. The fourth request message is used to request an AKMA temporary identifier of the terminal device. The first AKMA authentication function network element generates the AKMA temporary identifier. The first AKMA authentication function network element sends a fourth response message to the authentication server function network element. The fourth response message carries the AKMA temporary identifier.

In a possible design, the method further includes: The first AKMA authentication function network element receives a fifth request message sent by an AKMA application function network element. The fifth request message is used to request a communication key used when the terminal device communicates with the AKMA application function network element. When the first AKMA authentication function network element can serve the AKMA application function network element, the first AKMA authentication function network element obtains, from the authentication server function network element, a key Kakma for an AKMA service corresponding to the AKMA temporary identifier. The first AKMA authentication function network element generates the communication key based on the Kakma. The first AKMA authentication function network element sends the communication key to the AKMA application function network element.

In a possible design, the method further includes: When the first AKMA authentication function network element cannot serve the AKMA application function network element, the first AKMA authentication function network element determines a second AKMA authentication function network element. The first AKMA authentication function network element sends a fourth response message to the AKMA application function network element. The fourth response message indicates the AKMA application function network element to obtain a communication key from the second AKMA authentication function network element, and the fourth response message carries address information of the second AKMA authentication function network element.

According to a fifth aspect, a communication system is provided, including an authentication server function network element and a unified data management network element.

The authentication server function network element is configured to send a first request message to the unified data management network element in a registration procedure of a terminal device. The first request message includes an identifier of the terminal device. The unified data management network element is configured to: determine, based on subscription data of the terminal device, that the terminal device supports an authentication and key management for applications AKMA service; and send a first response message to the authentication server function network element. The first response message includes first indication information, and the first indication information indicates that the terminal device supports the AKMA service. The authentication server function network element is further configured to: determine an AKMA temporary identifier of the terminal device after primary authentication on the terminal device succeeds, and send the AKMA temporary identifier to the terminal device via a mobility management network element.

In a possible design, the AKMA temporary identifier includes a random value, a home network identifier, and a routing indicator. The random value, allocated by a network device, is a parameter identifying the terminal device, the home network identifier indicates a home network of the terminal device, and the routing indicator is used to determine a network function entity generating a key Kakma for the AKMA service.

In a possible design, the AKMA temporary identifier further includes at least one of address information of an AKMA authentication function network element or address information of an AKMA application function network element.

In a possible design, when determining the AKMA temporary identifier of the terminal device, the authentication server function network element is specifically configured to generate the AKMA temporary identifier.

In a possible design, the communication system further includes a first AKMA authentication function network element. When determining the AKMA temporary identifier of the terminal device, the authentication server function network element is specifically configured to send a second request message to the first AKMA authentication function network element. The second request message is used to request the first AKMA authentication function network element to generate the AKMA temporary identifier. The first AKMA authentication function network element is configured to: determine the AKMA temporary identifier, and send a second response message to the authentication server function network element. The second response message carries the AKMA temporary identifier.

In a possible design, when determining the AKMA temporary identifier of the terminal device, the authentication server function network element is specifically configured to determine the AKMA temporary identifier based on first auxiliary information. The first auxiliary information includes at least one of slice information of the terminal device, data network name information of the terminal device, or service and session continuity mode information of the terminal device.

In a possible design, the system further includes a mobility management network element. The authentication server function network element is further configured to send a third request message to the mobility management network element. The third request message carries the first indication information. The mobility management network element is configured to: obtain the first auxiliary information, and send a third response message to the authentication server function network element. The third response message carries the first auxiliary information.

In a possible design, the third request message is a unified data management UDM service-based request message used for obtaining of an authentication vector, and the third response message is a UDM service-based response message used for obtaining of the authentication vector.

In a possible design, the communication system further includes the AKMA application function network element and the first AKMA authentication function network element. The AKMA application function network element is configured to send a fourth request message to the first AKMA authentication function network element. The fourth request message carries the AKMA temporary identifier. The first AKMA authentication function network element is configured to: when the first AKMA authentication function network element can serve the AKMA application function network element, obtain, from the authentication server function network element, the key Kakma for the AKMA service corresponding to the AKMA temporary identifier; generate the communication key based on the Kakma; and send the communication key to the AKMA application function network element.

In a possible design, when obtaining, from the AKMA application function network element, the key Kakma for the AKMA service corresponding to the AKMA temporary identifier, the first AKMA authentication function network element is specifically configured to send a fifth request message to the authentication server function network element, where the fifth request message carries the AKMA temporary identifier; and the authentication server function network element is configured to: obtain a first key based on the AKMA temporary identifier, where the first key is an intermediate key generated in the primary authentication procedure; generate the key Kakma for the AKMA service based on the first key; and send the Kakma to the first AKMA authentication function network element.

In a possible design, the first AKMA authentication function network element is further configured to: when the first AKMA authentication function network element cannot serve the AKMA application function network element, determine address information of a second AKMA authentication function network element. The first AKMA authentication function network element is further configured to send a relocation message to the AKMA application function network element. The relocation message includes the address information of the second AKMA authentication function network element.

In a possible design, the AKMA application function network element is further configured to send a sixth request message to the second AKMA authentication function network element. The sixth request message includes the AKMA temporary identifier. The second AKMA authentication function network element is further configured to: obtain, from the authentication server function network element, the key Kakma for the AKMA service corresponding to the AKMA temporary identifier; generate the communication key based on the Kakma; and send the communication key to the AKMA application function network element.

In a possible design, the authentication server function network element is further configured to: after primary authentication on the terminal device succeeds, store a correspondence between the AKMA temporary identifier, the identifier of the terminal device, and the first key. When obtaining the first key based on the AKMA temporary identifier, the authentication server function network element is specifically configured to: obtain the first key based on the AKMA temporary identifier and the correspondence.

In a possible design, the first key is Kausf.

In a possible design, when the AKMA temporary identifier includes address information of the AKMA authentication function network element, the authentication server function network element updates the address information of the AKMA authentication function network element in the AKMA temporary identifier from first address information to second address information. The first address information is address information of the first AKMA authentication function network element, and the second address information is the address information of the second AKMA authentication function network element.

According to a sixth aspect, a communication apparatus is provided. The apparatus may be a terminal device or a chip in the terminal device, and the apparatus includes a transceiver module and a processing module, to perform corresponding functions in any one of the first aspect and the possible designs of the first aspect. Details are as follows:

The transceiver module is configured to: send a registration request message to a mobility management network element; and after authentication succeeds in a primary authentication procedure and non-access stratum NAS security protection is activated, receive a NAS-security-protected registration response sent by the mobility management network element. The registration response includes an authentication and key management for applications AKMA temporary identifier of the terminal device. The processing module is configured to store the AKMA temporary identifier.

For specific functions of the transceiver module and the processing module, refer to description in the first aspect. Details are not described herein again.

According to a seventh aspect, an apparatus is provided. The apparatus may be an authentication server function network element or a chip in the authentication server function network element. The apparatus includes a transceiver module and a processing module, to perform corresponding functions in any one of the second aspect and the possible designs of the second aspect. Details are as follows:

The transceiver module is configured to receive, in a registration procedure of a terminal device, first indication information sent by a unified data management network element. The first indication information indicates that the terminal device supports an authentication and key management for applications AKMA service.

The processing module is configured to determine an AKMA temporary identifier of the terminal device after primary authentication on the terminal device succeeds.

The transceiver module is further configured to send the AKMA temporary identifier to the terminal device via a mobility management network element.

For specific functions of the transceiver module and the processing module, refer to description in the second aspect. Details are not described herein again.

According to an eighth aspect, an apparatus is provided. The apparatus may be a unified data management network element or a chip in the unified data management network element. The apparatus includes a transceiver module and a processing module, to perform corresponding functions in any one of the third aspect and the possible designs of the third aspect. Details are as follows:

The transceiver module is configured to receive, in a registration procedure of a terminal device, a third request message sent by an authentication server function network element. The third request message includes an identifier of the terminal device.

The processing module is configured to determine, based on subscription data of the terminal device, that the terminal device supports an authentication and key management for applications AKMA service.

The transceiver module is further configured to send a third response message to the authentication server function network element. The third response message includes first indication information, and the first indication information indicates that the terminal device supports the AKMA service.

For specific functions of the transceiver module and the processing module, refer to description in the third aspect. Details are not described herein again.

According to a ninth aspect, an apparatus is provided. The apparatus may be a first AKMA authentication function network element or a chip in the first AKMA authentication function network element. The apparatus includes a transceiver module and a processing module, to perform corresponding functions in any one of the fourth aspect and the possible designs of the fourth aspect. Details are as follows:

The transceiver module is configured to receive, in a registration procedure of a terminal device, a fourth request message sent by an authentication server function network element. The fourth request message is used to request an AKMA temporary identifier of the terminal device.

The processing module is configured to generate the AKMA temporary identifier.

The transceiver module is further configured to send a fourth response message to the authentication server function network element. The fourth response message carries the AKMA temporary identifier.

According to a tenth aspect, a communication apparatus is provided, including a communication interface, a processor, and a memory. The memory is configured to store computer-executable instructions. The processor is configured to execute the computer-executable instructions stored in the memory, to enable the communication apparatus to send/receive a message through the communication interface, and implement functions of the following devices in the method in any one of the first aspect to the fourth aspect.

According to an eleventh aspect, a computer-readable storage medium is provided. The storage medium stores computer instructions. When the computer instructions are executed by a communication apparatus, the communication apparatus is enabled to perform the method in any one of the first aspect to the fourth aspect.

According to a twelfth aspect, a computer program product is provided. The computer program product includes a computer instruction. When the computer instructions are executed by a communication apparatus, the communication apparatus is enabled to perform the method in any one of the first aspect to the fourth aspect.

According to a thirteenth aspect, an apparatus is provided, to implement the method in any one of the first aspect to the fourth aspect.

According to a fourteenth aspect, an apparatus is provided, including a processor and a memory. The processor is coupled to the memory, and the processor is configured to perform the method in any one of the first aspect to the fourth aspect.

DESCRIPTION OF EMBODIMENTS

Embodiments of this application is applicable to communication systems such as a 4G (fourth generation mobile communication system) evolved system, for example, a long term evolution (LTE) system; a 5G (fifth generation mobile communication system) system, for example, a new radio access technology (New RAT) access network; and a cloud radio access network (CRAN) or even a future 6G (sixth generation mobile communication system) communication system.

Figure 1:
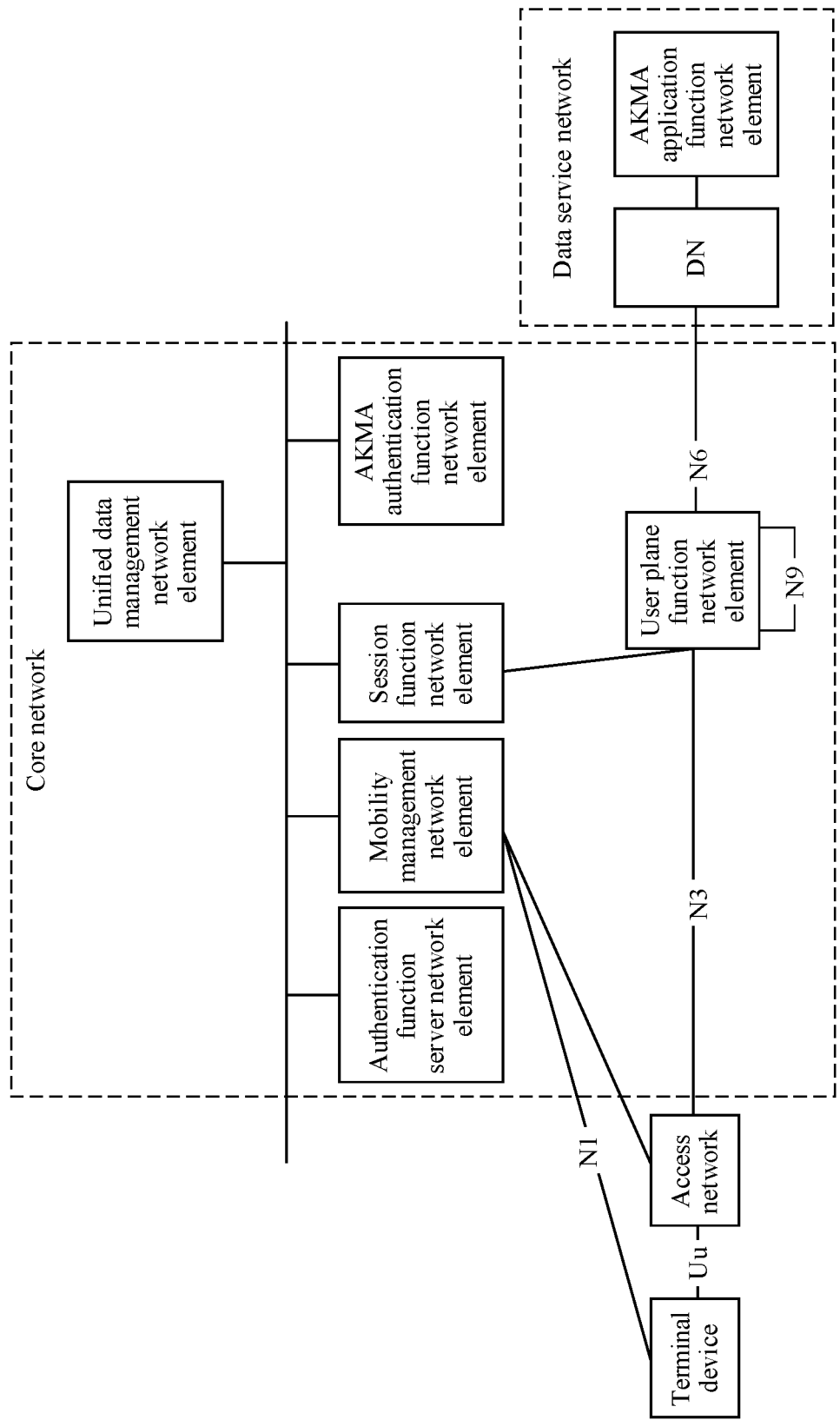
FIG. 1 is a schematic diagram of a network architecture according to an embodiment of this application.

Refer to FIG. 1. FIG. 1 shows a network architecture according to an embodiment of this application. The network architecture includes at least a terminal device, an access network (AN), a core network, and a data service network. It may be understood that FIG. 1 is merely an example for description, and is not intended to limit this application.

The terminal device may be a terminal for short, and is a device having a wireless sending/receiving function. The terminal device may be deployed on land, including indoor, outdoor, in a handheld manner or vehicle-mounted manner, may be deployed on water (for example, on a ship), or may be deployed in the air (for example, on a plane, a balloon, or a satellite). The terminal device may be a mobile phone, a tablet computer (pad), a computer having a wireless sending/receiving function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, user equipment (UE), or the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future fifth generation (the 5th generation, 5G) network, a terminal device in a future evolved public land mobile network (PLMN), or the like. The terminal device sometimes may also be referred to as a terminal device, user equipment (UE), an access terminal device, a vehicle-mounted terminal device, an industrial control terminal device, a UE unit, a UE station, a mobile station, a mobile, a remote station, a remote terminal device, a mobile device, a UE terminal device, a terminal device, a wireless communication device, a UE agent, a UE apparatus, or the like. The terminal device may be fixed or mobile. This is not limited in embodiments of this application.

The access network AN may use different types of access technologies. For example, the access network may use a 3rd generation partnership project (3GPP) access technology (for example, a radio access technology used in a 3G, 4G, or 5G system) or a non 3rd generation partnership project (non-3GPP) access technology. An access network using the 3GPP access technology is referred to as a radio access network (RAN). For example, an access network device in a 5G system is referred to as a next generation node base station (gNB) or the like. The non-3GPP access technology is an access technology that does not comply with 3GPP specifications, for example, an air interface technology represented by a wireless fidelity access point (Wi-Fi AP).

The core network may include one or more of an authentication server function network element, a mobility management network element, a session management function network element, an authentication and key management for applications (AKMA) authentication function network element, a unified data management network element, a user plane function network element, or the like. The user plane function network element is used as an egress for a user plane data, and is mainly configured to connect to an external network. The authentication function server network element is a function entity in a network used to authenticate UE, and is mainly configured for the network to verify authenticity of the UE. The mobility management network element is mainly responsible for mobility management. The session management function network element is mainly configured to allocate a session resource to a user plane. The unified data management network element is configured to store subscription data of a subscriber, and generate a long-term key used for authenticating the subscriber. The AKMA authentication function network element is a function entity for processing AKMA authentication, and is mainly configured to provide an AKMA authentication/anchor function.

It should be noted that the network elements in the foregoing core network may have different names in different communication systems. For example, the mobility management network element may be referred to as a mobility management entity (MME) in the fourth generation mobile communication system. The mobility management network element may be referred to as an access and mobility management function (AMF) or the like in the fifth generation mobile communication system. In embodiments of this application, the fifth generation mobile communication system is used as an example to describe the foregoing core network element, and is not intended to limit embodiments of this application. For example, in the fifth generation mobile communication system, the user plane function network element may be referred to as a user function (UPF), the authentication server function network element may be referred to as an authentication server function (AUSF), the mobility management network element may be referred to as an AMF, the session management function network element may be referred to as a session management function (SMF), the unified data management network element may be referred to as unified data management (UDM), and the AKMA authentication function network element may be referred to as an AKMA authentication function (AAuF).

It may be understood that the core network element in FIG. 1 is merely an example for description, and is not intended as a limitation. For example, in embodiments of this application, in addition to the core network element shown in FIG. 1, the core network may further include one or more of a network slice selection function (Network Slice Selection Function, NSSF) network element, a network exposure function (NEF) network element, a network repository function (NRF) network element, a policy control function (PCF) network element, an application function (AF) network element, or an SCP network element.

The data service network may specifically be a data network (DN), or the like. An AKMA application function (AApF) network element may be deployed on one or more servers in the DN, and provides a data service for a 3GPP user terminal. It may be understood that the AKMA application function network element may be deployed on a server in the DN, or may be deployed in the core network. This is not limited. In embodiments of this application, description is provided by using an example in which the AKMA application network element is deployed on a server in the DN.

Figure 2:
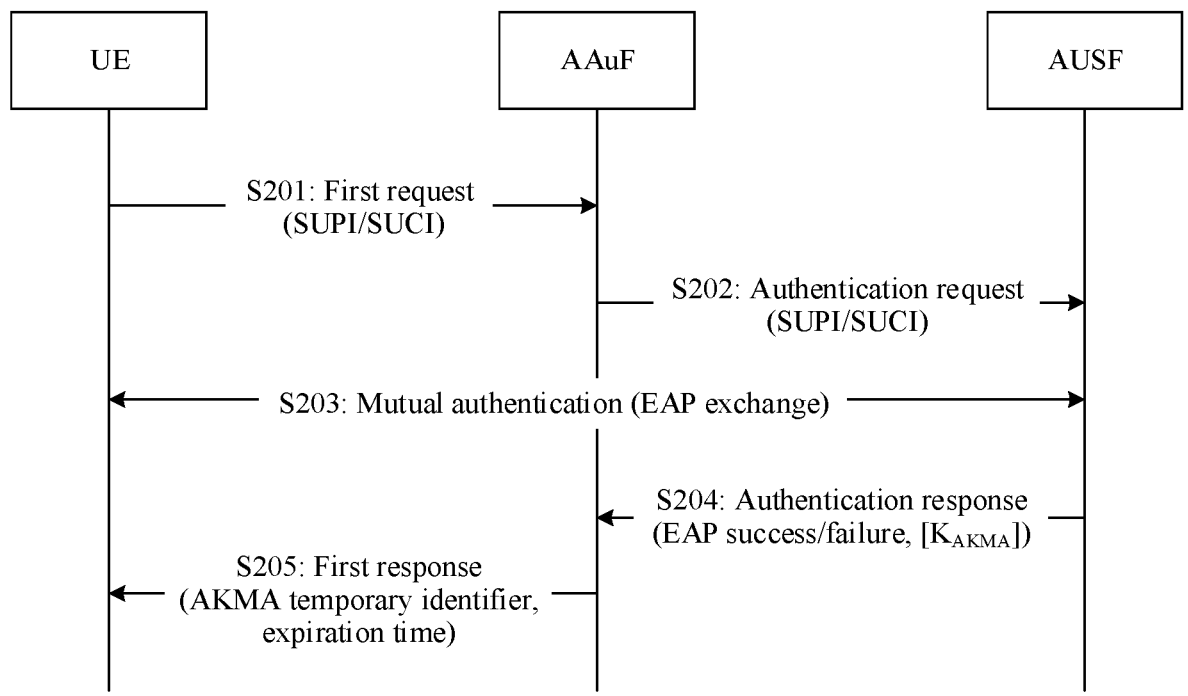
FIG. 2 is a schematic diagram of AKMA authentication according to an embodiment of this application.

Embodiments of this application provide an application scenario for the architecture shown in FIG. 1. In the application scenario, the terminal device may support an AKMA service, and a core network device may perform AKMA authentication on the terminal device. As shown in FIG. 2, an AKMA authentication procedure is provided. In the procedure, UE may specifically be the terminal device in the architecture shown in FIG. 1, an AAuF may specifically be the AKMA authentication function network element in the architecture shown in FIG. 1, and an AUSF may specifically be the authentication function server network element in the architecture shown in FIG. 1. The procedure includes the following steps.

S201: The UE sends a first request to the AAuF, where the first request carries a subscriber permanent identifier (SUPI) or a subscriber concealed identifier, (SUCI) of the terminal device. It may be understood that the UE may send the first request to the AAuF by using an AApF. For example, after receiving the first request, the AApF finds that AKMA authentication on the UE has not succeeded. In this case, the AApF may forward the first request to the AAuF.

S202: The AAuF sends an authentication request to the AUSF, where the authentication request carries the SUPI or SUCI of the terminal device.

S203: Perform mutual authentication between the AUSF and the UE, where mutual authentication may specifically be extensible authentication protocol (EAP) exchange. If mutual authentication between the UE and the AUSF succeeds, it may be considered that AKMA authentication on the terminal device succeeds.

S204: After authentication succeeds, the AUSF sends an authentication response to the AAuF, where the authentication response carries an indication indicating successful AKMA authentication and a key Kakma for the AKMA service of the terminal device. Correspondingly, after receiving the authentication response, the AAuF may store the Kakma, and allocate an AKMA temporary identifier to the terminal device. The Kakma is used to generate a communication key between the terminal device and the AKMA application function network element. In an embodiment of this application, the AAuF may use the Kakma to generate, for different AKMA application function network elements, communication keys for communication with the terminal device. Specifically, the AAuF may generate, based on the Kakma and an identifier of the AKMA application function network element, a communication key for communication between the AKMA application function network element and the terminal device. It is clear that the communication keys used by the different AKMA application function network elements to communicate with the same terminal device may be different.

S205: The AAuF sends a first response to the UE, where the first response includes the AKMA temporary identifier of the terminal device and expiration time of the AKMA temporary identifier. Correspondingly, the terminal device stores the AKMA temporary identifier.

According to the foregoing method, it can be learned that after the UE is successfully registered and primary authentication is completed, additional AKMA authentication needs to be performed. In addition, after AKMA authentication succeeds, the AKMA temporary identifier is allocated to the terminal device. Consequently, the authentication procedure is complex, and signaling overheads are large.

In view of this, this application provides a communication method. Principles of the communication method are as follows: In a registration procedure of the UE, primary authentication is required between the UE and a network device. In embodiments of this application, in the registration procedure of the UE, after primary authentication between the UE and the network device succeeds, it is considered that AKMA authentication on the UE also succeeds, and the AKMA temporary identifier is allocated to the UE. It can be learned that in embodiments of this application, no additional AKMA authentication on the UE is required. This simplifies an authentication procedure and reduces signaling overheads.

It should be noted that, in the description of this application, terms such as "first" and "second" in "first request message" and "second request message" are only used for distinction and description, and cannot be understood as an indication or implication of relative importance or an indication or implication of an order. Term "and/or" describes an association relationship between associated objects and indicates that three relationships may exist. For example, A and/or B may indicate the following cases: Only A exists, both A and B exist, and only B exists, where A and B may be singular or plural. At least one (piece) of a, b, or c may indicate a, b, c, a and b, a and c, b and c, or a, b, and c, where a, b, and c each may be singular or plural.

Figure 3:
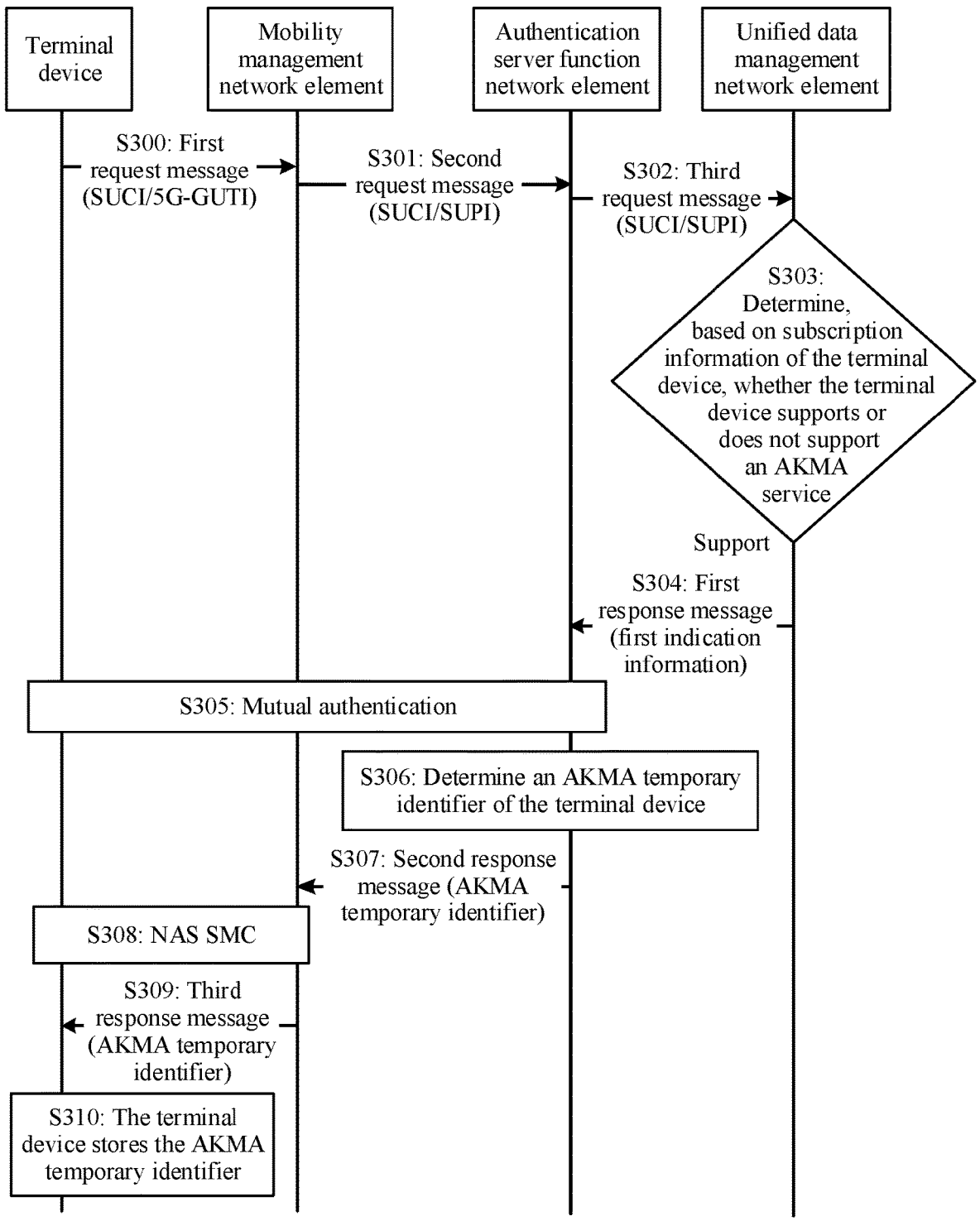
FIG. 3 is a schematic diagram of AKMA authentication according to an embodiment of this application.

Refer to FIG. 3. A procedure of a communication method is provided. In the procedure, a terminal device may be the terminal device in the architecture in FIG. 1, a mobility management network element may be the mobility management network element in the architecture in FIG. 1, an authentication server function network element may be the authentication server function network element in the architecture in FIG. 1, and a unified data management network element may be the unified data management network element in the architecture in FIG. 1. The procedure is specifically as follows.

S300: The terminal device sends a first request message to the mobility management network element in a registration procedure of the terminal device, where the first request message carries a subscriber concealed identifier (subscriber concealed identifier, SUCI) or a 5G globally unique temporary UE identity (5G globally unique temporary UE identity, 5G-GUTI) of the terminal device.

Optionally, the first request message may be a registration request. When the terminal device has no security context, the first request message may carry the SUCI, where the SUCI is subscriber concealed identity information of the terminal device. When the UE has security context, the first request message may carry the 5G-GUTI, where the 5G-GUTI is a temporary UE identifier.

S301: The mobility management network element sends a second request message to the authentication server function network element, where the second request message carries the SUCI or an SUPI of the terminal device. The second request message is used to trigger authentication on the UE. Authentication may be primary authentication, AKMA authentication, or the like. This is not specifically limited. Optionally, the second request message may be referred to as a UE authentication request message (Nausf_UE_Authentication request). When the second request message carries the SUCI of the terminal device, the mobility management network element may directly obtain the SUCI of the terminal device from the second request message. When the second request message carries the 5G-GUTI of the terminal device, the mobility management network element may determine the subscriber permanent identifier (SUPI) of the terminal device based on the 5G-GUTI of the terminal device. For example, if the mobility management network element needs to authenticate the terminal device, the mobility management network element may determine the SUPI of the terminal device based on the GUTI of the terminal device when authenticating the terminal device.

S302: The authentication server function sends a third request message to the unified data management network element, where the third request message carries the SUCI or the SUPI of the terminal device. The third request message is used to request an authentication vector from the unified data management network element. The authentication vector requested by the third request message may be an authentication vector used for primary authentication, the authentication vector requested by the third request message may be an authentication vector used for AKMA authentication, or the authentication vector requested by the third request message may be used for primary authentication, AKMA authentication, and the like. This is not limited.

S303: The unified data management network element determines, based on subscription information of the terminal device, whether the terminal device supports or does not support an AKMA service. For example, the unified data management network element may determine the subscription information of the terminal device based on the SUCI or the SUPI of the terminal device carried in the third request message. For example, when the third request message carries the SUCI, the unified data management network element needs to first obtain the SUPI from the SUCI, then determine the subscription information of the terminal device based on the SUPI, and further determine, based on the authentication information of the terminal device, whether the terminal device supports the AKMA service.

If the unified data management network element determines that the terminal device does not support the AKMA service, the unified data management network element performs a corresponding operation according to the description in clause 6.1 of the existing specification 3GPP TS 33.501. If the unified data management network element determines that the terminal device supports the AKMA service, the unified data management network element performs the following step S304.

S304: The unified data management network element sends a first response message to the authentication server function network element, and the authentication server function network element receives the first response message, where the first response message carries first indication information, and the first indication information may explicitly or implicitly indicate that the terminal device supports the AKMA service. Specifically, when the first indication information is a first preset value, it indicates that the terminal device supports the AKMA service. When the first indication information is a second preset value, it indicates that the terminal device does not support the AKMA service. For example, the first indication information may be a 1-bit symbol. When a current value of the symbol is 0, it indicates that the terminal device does not support the AKMA service. When the value is 1, it indicates that the terminal device supports the AKMA service. Alternatively, the first indication information may implicitly indicate that the terminal device supports the AKMA service. For example, if characters such as "AKMA" is included in the first response message, it indicates that the terminal device supports the AKMA service. A form of the first indication information may be an enumeration form, that is, a format of a character string, or the like. This is not limited.

Optionally, the first response message may further carry one or more of first auxiliary information, an authentication vector (AV), the SUPI of the terminal device, the SUCI of the terminal device, or the like. The first response message may specifically be a UE authentication get response message (Nudm_UE Authentication_Get Response). The first auxiliary information may include at least one piece of subscription data such as slice information, data network name (DNN) information, and service and session continuity mode (SSC, mode) information of the terminal device. The first auxiliary information may include some or all subscription information of a subscriber.

In an embodiment of this application, the unified data management network element may determine, based on one or more of the following cases, whether the first auxiliary information needs to be provided for the authentication server function network element. If the first auxiliary information needs to be provided for the authentication server function network element, the first response message carries the first auxiliary information. If the first auxiliary information does not need to be provided for the authentication server function network element, the first response message may carry no first auxiliary information.

Case 1: The unified data management network element may determine, based on the subscription information of the terminal device, whether the first auxiliary information needs to be provided for the authentication server function network element. For example, if the unified data management network element determines, based on the subscription information of the terminal device, that the terminal device is a terminal device having a low latency requirement, the unified data management network element provides the first auxiliary information for the authentication server function network element. For another example, if the UDM determines, based on the subscription information of the terminal device, that the terminal device has a special requirement, the UDM provides the first auxiliary information for the authentication server function network element.

Case 2: The unified data management network element may detect whether the terminal device is authenticated. If the unified data management network element determines that the terminal device is authenticated, the unified data management network element may notify all or a part of the first auxiliary information to the authentication server function network element. If the unified data management network element determines that the terminal device is not authenticated, or that authentication information has expired although the terminal device is authenticated, the unified data management network element may notify a part of information in the first auxiliary information to the authentication server function network element. For example, the part of information in the first auxiliary information may not include location information of the terminal device.

Case 3: The unified data management network element may detect a current-phase procedure of the terminal device, and determine, based on different current-phase procedures of the terminal device, whether the first auxiliary information needs to be provided for the authentication server function network element. For example, the terminal device does not need to provide the first auxiliary information for the authentication server function network element if the terminal device is currently in a mobility management (MM) procedure. The terminal device needs to provide the first auxiliary information for the authentication server function network element if the terminal device is currently in a session management (SM) procedure.

Optionally, in S305, mutual authentication is performed between the authentication server function network element and the terminal device. It should be noted that the procedure shown in FIG. 3 includes S305 if the procedure shown in FIG. 3 is a registration procedure including authentication. The procedure shown in FIG. 3 may not include S305 if the procedure shown in FIG. 3 is a PDU session establishment procedure.

The authentication server function network element may authenticate the terminal device, and the terminal device may authenticate an entire wireless network. Specifically, the authentication server function network element may perform authentication on the UE according to the description in clause 6.1 of the existing specification 3GPP TS 33.501. Similarly, the UE may also perform authentication on the authentication server function network element according to the description in clause 6.1 of the existing specification 3GPP TS 33.501. The authentication method may specifically be EAP-AKA authentication, 5G-AKA authentication, or another authentication method. This is not limited in this application.

S306: The authentication server function network element determines an AKMA temporary identifier of the terminal device. The AKMA temporary identifier of the terminal device may also be referred to as an AKMA temporary identity of the terminal device or the like. The AKMA temporary UE identifier is used when the UE accesses the AKMA application function network element.

The AKMA temporary identifier includes at least a random value, a home network identifier, and a routing indicator (RI). The random value, allocated by the network side device, is a parameter identifying the terminal device. The home network identifier indicates a home network of the terminal device. The routing indicator is used to determine a network function entity generating a key Kakma for the AKMA service. For example, the network function entity generating the key Kakma for the AKMA service is the authentication server function network element. Optionally, a device in the network, for example, an AMF, may determine the authentication server function network element based on the home network identifier and the routing indicator. Optionally, the AKMA temporary identifier may further include at least one of address information of an AKMA authentication function entity or address information of an AKMA user plane function entity.

Alternatively, the AKMA temporary identifier carries at least temporary identity information of the terminal device, home network information of the terminal device, and address information of the authentication server function network element. Further, the home network information may include a mobile network code (MNC), a mobile country code (MCC), and the like. The address information of the authentication server function network element is information that can be used to find the authentication server function network element. For example, the address information of the authentication server function network element may include number information of the authentication server function network element and/or routing information (routing ID) of the authentication server function network element. Number information of an authentication server function network element may be a number allocated by an operator to the authentication server function network element in a network, and is used to determine the authentication server function network element. Routing information of an authentication server function network element is stored in a terminal device or stored in a global subscriber identity module (universal subscriber identity module, USIM). When UE generates an SUCI, the SUCI carries a routing ID used by the mobility management network element to determine an authentication server function network element that can serve the UE. If the address information of the authentication server function network element cannot globally uniquely identify the authentication server function network element, the home network information of the terminal device and the address information of the authentication server function network element need to be used together when the specific authentication server function network element is determined. Optionally, the AKMA temporary identifier of the terminal device further includes address information of an AKMA authentication function network element and/or address information of an AKMA application function network element. The address information of the AKMA authentication function network element is information that can uniquely determine the AKMA authentication function network element. For example, the address information of the AKMA authentication function network element may include number information of the AKMA authentication function network element and/or routing information (routing ID) of the AKMA authentication function network element. Number information of an AKMA authentication function network element may be a number allocated by an operator to the AKMA authentication function network element in a network, and is used to determine the AKMA authentication function network element. Routing information of an AKMA authentication function network element may be obtained by an authentication server function network element through query, for example, by querying a network management system or an NRF, or may be obtained from a locally preconfigured list. The routing information of the AKMA authentication function network element may be used by an AKMA application function network element or UE to determine the AKMA authentication function network element serving the UE. If the address information of the AKMA authentication function network element cannot globally uniquely identify the AKMA authentication function network element, the home network information of the terminal device and the address information of the AKMA authentication function network element need to be used together when the specific AKMA authentication function network element is determined. The address information of the AKMA application function network element is information that can uniquely determine the AKMA application function network element. For example, the address information of the AKMA application function network element may include number information of the AKMA application function network element and/or routing information (routing ID) of the AKMA application function network element. Number information of an AKMA application function network element may be a number allocated by an operator or an application provider to the AKMA application function network element in a network, and is used to determine the AKMA application function network element. Routing information of an AKMA application function network element may be obtained through query, for example, obtained by an AKMA authentication function network element or an authentication server function network element by querying a network management system or an NRF, or may be obtained from a locally preconfigured list. The routing information of the AKMA authentication function network element may be used by the AKMA application function network element or UE to determine the AKMA authentication function network element serving the UE. If the address information of the AKMA application function network element cannot globally uniquely identify the AKMA application function network element, the home network information of the terminal device and the address information of the AKMA application function network element need to be used together when the specific AKMA application function network element is determined.

Further, the address information of the AKMA authentication function network element may be determined by the authentication server function network element. For example, the AKMA authentication function network element may be a default AKMA authentication function network element or an AKMA authentication function network element specified in a protocol. Alternatively, the AKMA authentication function network element may be an AKMA authentication function network element determined by the authentication server function network element based on the first auxiliary information in S204, or the like. For example, if the first auxiliary information includes the location information of the terminal device, the authentication server function network element may query another core network entity (for example, an NRF), a network management configuration list, a pre-configuration list of the authentication server function network element, or the like for an AKMA authentication function network element closest to the terminal device. Alternatively, if the first auxiliary information includes the slice information, the DNN information, the SSC mode information, and the like of the terminal device, the authentication server function network element may comprehensively select, based on all or a part of information in the first auxiliary information, an AKMA authentication function network element that meets a condition. For example, the authentication server function network element may select an AKMA authentication function network element that may serve a slice-data network name. The address information of the AKMA application function network element may be determined by the authentication server function network element, or may be determined by the AKMA authentication function network element. For example, when an AKMA application function network element is bound to an AKMA authentication function network element, the AKMA application function network element is determined if the AKMA authentication function network element is determined. For another example, the AKMA application function network element is an application on a mobile edge computing (MEC) entity. The authentication server function network element or the AKMA authentication function network element determines a to-be-used specific mobile edge computing function, in other words, a to-be-used specific AKMA application function network element. If address information of the AKMA application function network element or address information of the AKMA authentication function network element is related to the mobile edge computing entity, the address information of the AKMA application function network element or the address information of the AKMA authentication function network element may alternatively be or include the address information of the mobile edge computing entity. Similarly, address information of a mobile edge computing entity may be used as address information for uniquely determining the mobile edge computing entity, or address information for determining the mobile edge computing entity together with an MCC and an MNC.

For example, the temporary identity information of the terminal device may include binary bits. For example, 32 bits including 0 and/or 1 may constitute a temporary identifier of the terminal device. The authentication server function network element may generate a random value to be used for the temporary identity information of the terminal device. Alternatively, some fields in the authentication server function network element are used as the temporary identity information of the device, or the authentication server function network element further generates a random value, where all or a part of the random value is used as the temporary identity information of the terminal device. Alternatively, the authentication server function network element may generate the temporary identity information or the like of the terminal device based on a RAND value in the authentication vector, for example, use a part of the RAND value, or directly use the entire RAND value. Alternatively, the authentication server function network element may request a random value from the unified data management network element, and determine temporary identity information or the like of the UE based on the requested random value. Alternatively, the authentication server function network element transfers the requested random value to the AKMA authentication function network element. Then, the AKMA authentication function network element determines the temporary identity information of the terminal device based on the random value, and then transfers the temporary identifier of the terminal device to the authentication server function network element or the like. Alternatively, the authentication server function network element may determine the temporary identifier or the like of the terminal device based on the SUCI of the terminal device. For example, the temporary identity information of the UE may be generated based on an encrypted field in the SUCI of the terminal device. Alternatively, the AKMA authentication function network element may determine the temporary identity information of the terminal device based on the SUCI of the terminal device. For example, the temporary identity information of the UE may be generated based on an encrypted field in the SUCI of the terminal device, and then the AKMA authentication function network element transfers the temporary identifier of the terminal device to the authentication server function network element. This is not limited.

For example, the AKMA temporary identifier of the terminal device may be constituted in one or more of the following manners:

"ridxxxx.tid<value>@AAuF<Value>.mnc<MNC>.mnc<MCC>0.3gppnetwork.org,
ridxxxx.tid<value>@AApF<Value>.AAuF<Value>.mnc<MNC>.mnc<MCC>0.3gppnetwork.org,
AApF<Value>.ridxxxx.tid<value>@AAuF<Value>.mnc<MNC>.mnc<MCC>0.3g ppnetwork.org,
AAuF<Value>.ridxxx.tid<value>@mnc<MNC>.mnc<MCC>0.3gppnetwork.org,
AApF<Value>.AAuF<Value>.AAuF<Value>.ridxxx.tid<value>@mnc<MNC>.mnc<MCC>0.3gppnetwork.org, or
tid<value>@AAuF<Value>.ridxxx.mnc<MNC>.mnc<MCC>0.3gppnetwork.org", where rid is short for routing ID, which is a routing ID of the authentication server function network element, and xxxx is four decimal digits, which indicate routing information of the authentication server function network element and are used to find the authentication server function network element. tid<value> indicates temporary identity information allocated to the UE, where tid is short for temporary identifier. AAuF<Value> indicates address information of an AAuF serving the UE, and the information may help the UE or the AKMA application function network element find the AAuF, and may be ID information of the AAuF, routing information of the AAuF, or the like. mnc<MNC>.mnc<MCC> indicates a home network identifier of the UE. Optionally, AApF<Value> is carried, and indicates that address information of an AApF to be accessed by UE may ID information of the AApF, routing information of the AApF, or the like. 3gppnetwork.org indicates that a 3GPP network is accessed. When the AKMA temporary identity includes an AApF value and/or an AAuF value, the AApF value and the AAuF value may be default values, for example, both are 0s; or may be non-default values. A default value indicates that any AApF and/or AAuF may be used. A non-default value indicates that a specified AApF and/or AAuF needs to be accessed.

When the UE, AApF, and AAuF use the AKMA temporary identity, they may separately choose to use some fields in the AKMA temporary identity. For example, if the UE needs to search for an AApF, the UE may use the AApF<value>, or use AApF<value>.mnc<MNC> and mnc<MCC>. Further, the UE may search for and determine the AApF by using AApF<value>@mnc<MNC>.mnc<MCC>0.3gppnetwork.org. Similarly, when the AApF searches for and determines an AAuF, the AApF may use only AAuF<value>, or use AAuF<value>.mnc<MNC> and mnc<MCC>. When the AAuF determines the authentication server function network element, routing ID of the authentication server function network element, or the routing ID and a home network identifier of the authentication server function network element may be used. Therefore, AKMA temporary identities can play different roles depending on different users. A user can obtain necessary information based on an AKMAtemporary identity, to determine information about another AKMAnetwork element serving the UE.

It should be noted that in the composition methods in the examples, it does not explicitly indicate that this is temporary identity information of the AKMA. If explicit indication is required, indication information indicating that the temporary identity is used for an AKMA service needs to be added before or after the symbol "@". For example, a character string "AKMA" is added after the symbol "@". Therefore, the temporary identity may further include temporary identity information of the UE, home network information of the UE, address information of the authentication server function network element, and indication information indicating that the temporary identifier is used for an AKMA service.

In this embodiment of this application, the authentication server function network element may specifically send the AKMA temporary identifier determined in S306 to the terminal device by using the mobility management network element. For example, refer to the following description in S307 to S309.

S307: The authentication server function network element sends a second response message to the mobility management network element, where the second response message may carry the AKMA temporary identifier.

Optionally, the second response message may further carry an authentication result, the SUPI of the terminal device, and the like. That is, the AKMA temporary identifier may be sent to the mobility management network element together with the authentication result and the SUPI of the terminal device, or may be separately sent to the mobility management network element. For example, the AKMA temporary identity may be sent to the mobility management network element together with the authentication result and the SUPI of the terminal device if authentication occurs in the registration procedure. For another example, the AKMA temporary identity is sent to the serving network together with other content in the PDU session establishment procedure.

Optionally, in S308, a non-access stratum security mode control (NAS SMC) procedure is performed between the mobility management network element and the terminal device to activate NAS security protection. It should be noted that the procedure shown in FIG. 3 includes S308 if the procedure shown in FIG. 3 is a registration procedure. The procedure shown in FIG. 3 may not include S308 if the procedure shown in FIG. 3 is a PDU session establishment procedure.

S309: The mobility management network element sends a NAS-security-protected third response message to the terminal device, where the third response message carries the AKMA temporary identifier. Optionally, the third response message may be a registration accept (message of the terminal device, a PDU session establishment complete message of the terminal device, or the like. It may be understood that NAS security protection is performed on the third response message.

S310: The terminal device stores the AKMA temporary identifier.

According to the foregoing method, the unified data management network element determines whether the terminal device supports the AKMA service. If the unified data management network element supports the AKMA service, the authentication server function network element or the AKMA authentication function network element is notified to allocate the temporary identifier to the terminal device. If the unified data management network element does not support the AKMA service, no temporary identifier is allocated to the terminal device. Compared with that the authentication server function network element or the AKMA authentication function network element always allocates a temporary identifier to the terminal device regardless of whether the terminal device supports the AKMA service, the method reduces procedure overheads.

It should be noted that, in this embodiment of this application, an implementation process in which the authentication server function network element determines the AKMA temporary identifier of the terminal device may include one or more of the following manners in S306 in FIG. 3:

Manner 1: The authentication server function network element generates the AKMA temporary identifier of the terminal device.

Manner 2: The authentication server function network element sends a request message to the first AKMA authentication function network element, the first AKMA authentication function network element generates the AKMA temporary identifier of the terminal device, and the first AKMA authentication function network element sends the AKMA temporary identifier of the terminal device to the authentication server function network element. For details, refer to the following description in FIG. 4A and FIG. 4B.

Manner 3: The authentication server function network element determines the AKMA temporary identifier of the terminal device based on second auxiliary information. The second auxiliary information may include at least one of slice selection information of the terminal device or session and service continuity (SSC) mode information of the terminal device. A manner of determining the second auxiliary information by the authentication server function network element is not limited in embodiments of this application. For example, the second auxiliary information may be obtained from the mobility management network element in this embodiment of this application. For details, refer to the following description in FIG. 5A and FIG. 5B.

Figure 4A:
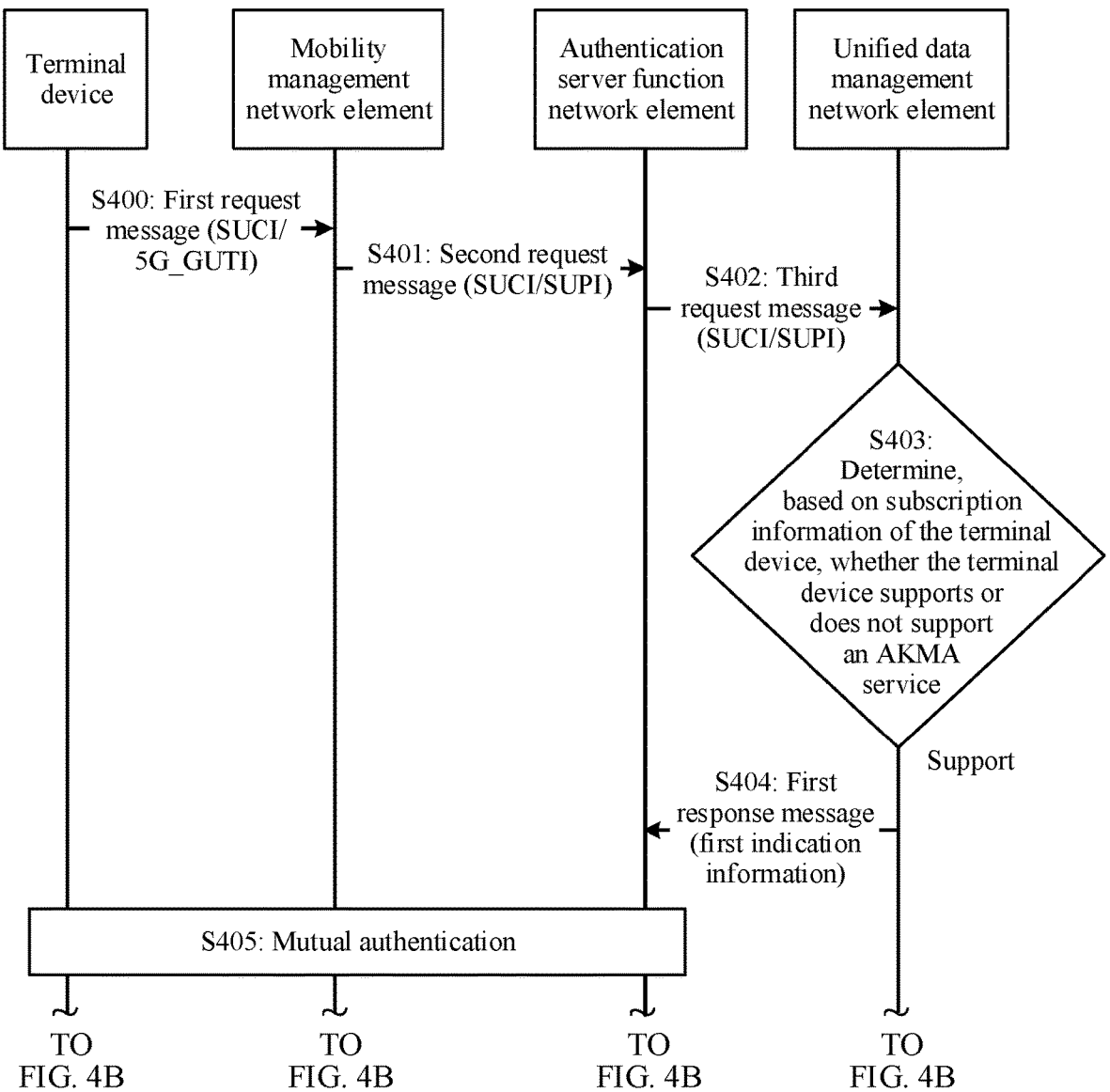
FIG. 4A and FIG. 4B are a schematic diagram of AKMA authentication according to an embodiment of this application.
Figure 4B:
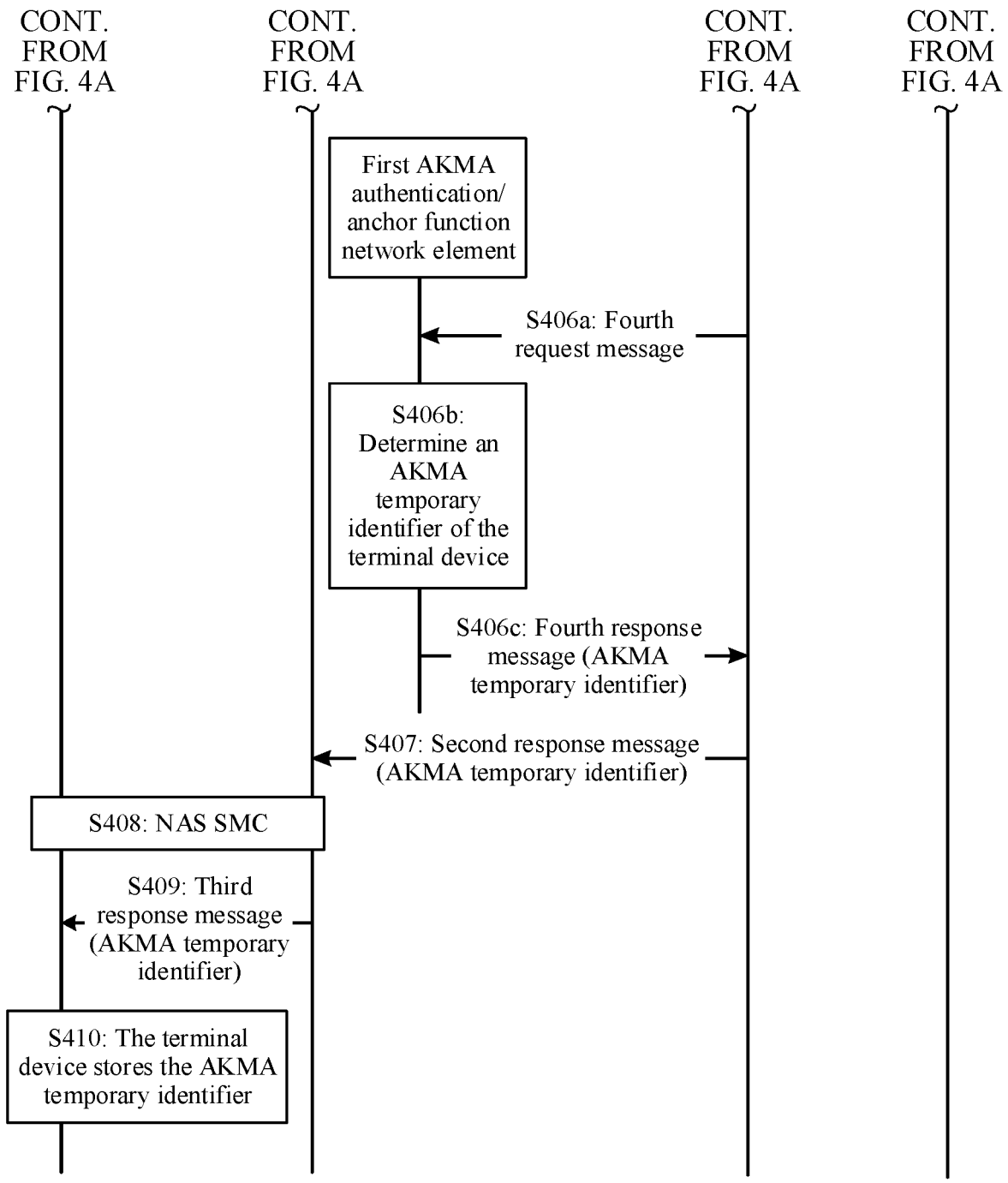

As shown in FIG. 4A and FIG. 4B, a procedure of a communication method is provided. In the procedure, a terminal device may be the terminal device in the architecture in FIG. 1, a mobility management network element may be the mobility management network element in the architecture in FIG. 1, an authentication server function network element may be the authentication server function network element in the architecture in FIG. 1, and a unified data management network element may be the unified data management network element in the architecture in FIG. 1. The procedure is specifically as follows.

S400 to S405 are the same as S300 to S305 in the embodiment in FIG. 3. For the related steps, refer to related description in the embodiment in FIG. 3. Details are not described herein again.

S406a: The authentication server function network element sends a fourth request message to a first AKMA authentication function network element, where the fourth request message is used to request the first AKMA authentication function network element to allocate an AKMA temporary identity to the terminal device.

The first AKMA authentication function network element may be a default AKMA authentication function network element, or the first AKMA authentication function network element may be an AKMA authentication function network element selected by the authentication server function network element based on the carried first auxiliary information in S404. This is not limited. Optionally, the fourth request message may carry information such as Kakma of the terminal device.

Optionally, when the authentication server function network element cannot determine an appropriate AKMA authentication function network element, the fourth request message carries the first auxiliary information. The authentication server function network element sends the first auxiliary information to the default AKMA authentication function network element. The default AKMA authentication function network element selects an appropriate AKMA authentication function network element, and returns address information of the AKMA authentication function network element to the authentication server function network element. The authentication server function network element requests the appropriate AKMA authentication function network element to allocate the AKMA temporary identifier to the terminal device.

S406b: The first AKMA authentication function network element determines the AKMA temporary identifier of the terminal device. Optionally, the first AKMA authentication function network element may further store an association relationship among the AKMA temporary identifier, an identifier of the terminal device, and a first key. The first key may implicitly indicate that AKMA authentication on the terminal device succeeds, and the first key is an intermediate key in a primary authentication procedure. For example, the first key may be Kausf. The identifier of the terminal device may be the SUCI, the SUPI, or the like.

S406c: The first AKMA authentication function network element sends a fourth response message to the authentication server function network element, where the fourth response message carries the AKMA temporary identifier.

S407 to S410 are the same as S307 to S310 in the embodiment in FIG. 3. For the related steps, refer to related description in the embodiment in FIG. 3. Details are not described herein again.

The AKMA authentication function network element generates the AKMA temporary identifier of the terminal device in a conventional technology. Therefore, the method shown in FIG. 4A and FIG. 4B is better compatible with the conventional technology.

Figure 5A:
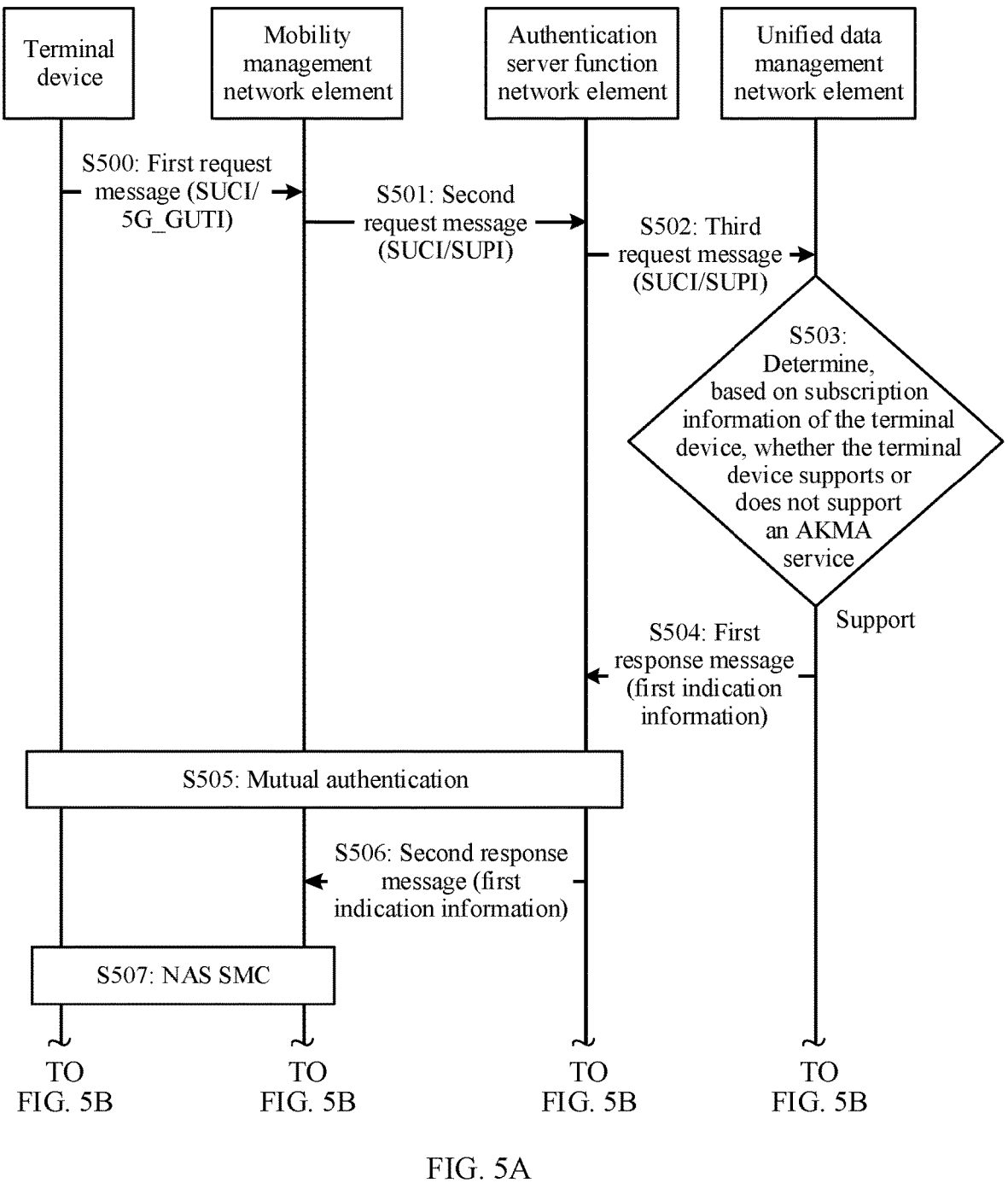
FIG. 5A and FIG. 5B are a schematic diagram of AKMA authentication according to an embodiment of this application.
Figure 5B:
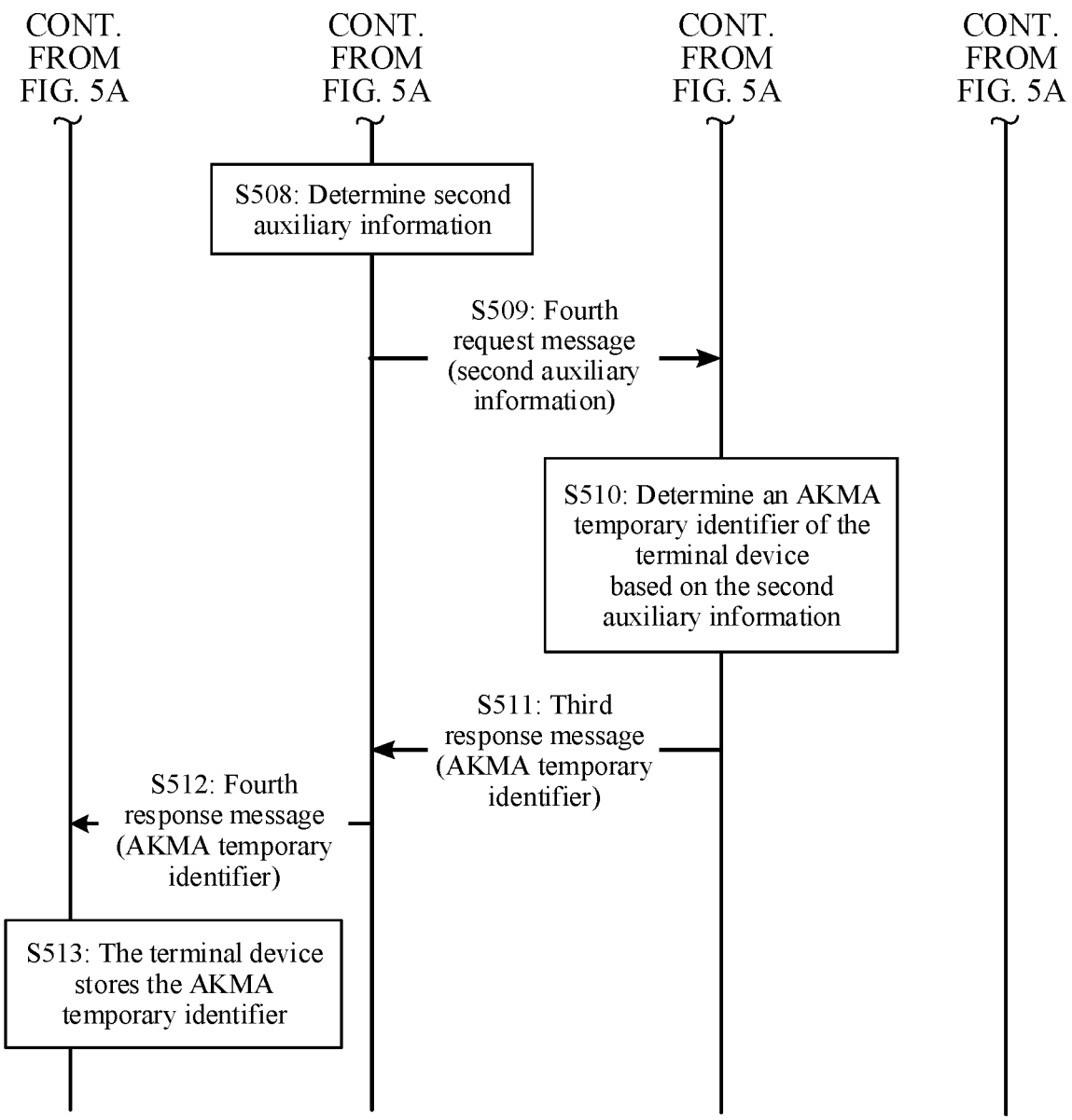

As shown in FIG. 5A and FIG. 5B, a procedure of a communication method is provided. In the procedure, a terminal device may be the terminal device in the architecture in FIG. 1, a mobility management network element may be the mobility management network element in the architecture in FIG. 1, an authentication server function network element may be the authentication server function network element in the architecture in FIG. 1, and a unified data management network element may be the unified data management network element in the architecture in FIG. 1. The procedure is specifically as follows.

S500: The terminal device sends a first request message to the mobility management network element.

S501: The mobility management network element sends a second request message to the authentication server function network element.

S502: The authentication server function network element sends a third request message to the unified data management network element.

S503: The unified data management network element determines, based on subscription information of the terminal device, whether the terminal device supports or does not support an AKMA service.

S504: The unified data management network element sends a first response message to the authentication server function network element.

Optionally, in S505, mutual authentication is performed between the terminal device and the authentication server function network element.

For a specific implementation process of S500 to S505, refer to description in S300 to S305 in the procedure shown in FIG. 3. Details are not described herein again.

Optionally, in S506, the authentication server function network element sends a second response message to the mobility management network element, where the second response message may carry a first indication, and the first indication may indicate that the terminal device supports the AKMA service. Optionally, the second response message may further carry the SUPI of the terminal device and/or an authentication success result (for example, an EAP success), and the second response message may also be referred to as Nauf-UT Authentication_Authenticate or the like. It should be noted that the procedure shown in FIG. 5A and FIG. 5B includes S506 if the procedure shown in FIG. 5A and FIG. 5B is a registration procedure including authentication. The procedure shown in FIG. 5A and FIG. 5B may not include S506 if the procedure shown in FIG. 5A and FIG. 5B is a PDU session establishment procedure.

Optionally, in 5507, a NAS SMC procedure is performed between the serving network and the terminal device, to activate NAS security protection.

It should be noted that the procedure shown in FIG. 5A and FIG. 5B includes S507 if the procedure shown in FIG. 5A and FIG. 5B is a registration procedure including authentication. The procedure shown in FIG. 5A and FIG. 5B may not include S507 if the procedure shown in FIG. 5A and FIG. 5B is a PDU session establishment procedure.

S508: The serving network determines second auxiliary information. Optionally, the second auxiliary information may specifically be terminal location management related information determined by the mobility management network element, or session management related information determined by an SMF, for example, slice selection information of the terminal device or session and service continuity (SSC) mode information of the terminal device. The first auxiliary information is subscription data information of the UE or information (for example, location information) stored by the unified data management network element. Different from the first auxiliary information, the second auxiliary information is information that is determined by the mobility management network element and/or the SMF and that is strongly related to a current network status of the UE. It may be understood that the second auxiliary information is more accurate than the first auxiliary information. Therefore, the second auxiliary information may be used to select a more appropriate AKMA application function network element and/or AKMA authentication function network element for the UE. For example, the second auxiliary information may be slice information (Allowed S-NSSAI) that allows the terminal device to use and that is determined by the mobility management network element in the registration procedure.

S509: The mobility management network element sends a fourth request message to the authentication server function network element, where the fourth request message carries the second auxiliary information. Optionally, the fourth request message may be referred to as _UE_Authentication Request.

S510: The authentication server function network element determines an AKMA temporary identifier of the terminal device based on the second auxiliary information.

It should be noted that, in an embodiment of this application, the AKMA temporary identifier may include a random value, a home network identifier, a routing indicator, and address information of an AKMA authentication function network element, and the second auxiliary information is used to determine address information of an appropriate AKMA authentication function network element and the AKMA temporary identifier.

Optionally, the authentication server function network element may determine the AKMA authentication function network element with reference to the first auxiliary information and the second auxiliary information.

Optionally, the authentication server function network element sends the first auxiliary information and the second auxiliary information to a default AKMA authentication function network element, so that the default AKMA authentication function network element allocates the AKMA temporary identifier to the terminal device. Alternatively, the default AKMA authentication function network element selects an appropriate AKMA authentication function network element, and returns address information of the appropriate AKMA authentication function network element to the authentication server function network element. Then, the authentication server function network element sends the first auxiliary information and the second auxiliary information to the appropriate AKMA authentication function network element, to request the appropriate AKMA authentication function network element to allocate the AKMA temporary identifier to the terminal device.

Optionally, the authentication server function network element may alternatively send only the second auxiliary information to the AKMA authentication function network element, to request the AKMA authentication function network element to allocate the AKMA temporary identifier to the terminal device.

S511: The authentication server function network element sends a third response message to the mobility management network element, where the third response message carries the AKMA temporary identifier of the terminal device. Optionally, the third response message may be referred to as UE_Authentication Response. A specific message name varies with a procedure.

S512: The mobility management network element sends a fourth response message to the terminal device, where the fourth response message carries the AKMA temporary identifier of the terminal device. Optionally, the fourth response message may be referred to as registration accept. A specific message name varies with a procedure.

S513: The terminal device stores the AKMA temporary identifier of the terminal device.

For example, it can be learned from the foregoing description that the AKMA temporary identifier of the terminal device may include address information of the AKMA authentication function network element. In this embodiment of this application, the authentication server function network element may select an appropriate AKMA authentication function network element based on the second auxiliary information fed back by the serving network. For example, in a scenario, the AKMA authentication function network element may be related to a slice. For example, one AKMA authentication function network element may serve at least one type of slice, or one AKMA authentication function network element may serve only one type of slice. Slices may be classified based on service types, and may include, for example, an eMBB slice, an internet of vehicles slice, and a low-latency slice. In this embodiment of this application, if the second auxiliary information includes slice type information, an AKMA authentication function network element that matches a slice type of the terminal device may be selected for the terminal device by using the method in this embodiment of this application.

It should be noted that, in this embodiment of this application, the temporary identifier may be allocated to the terminal device by using the methods in FIG. 3, FIG. 4A and FIG. 4B, and FIG. 5A and FIG. 5B. In the following FIG. 6A and FIG. 6B or FIG. 7A and FIG. 7B, the following is described: How a terminal device obtains a communication key Kaf between the terminal device and an AKMA application function network element based on an AKMA temporary identifier, to protect communication between the terminal device and the AKMA application function network element.

Figure 6A:
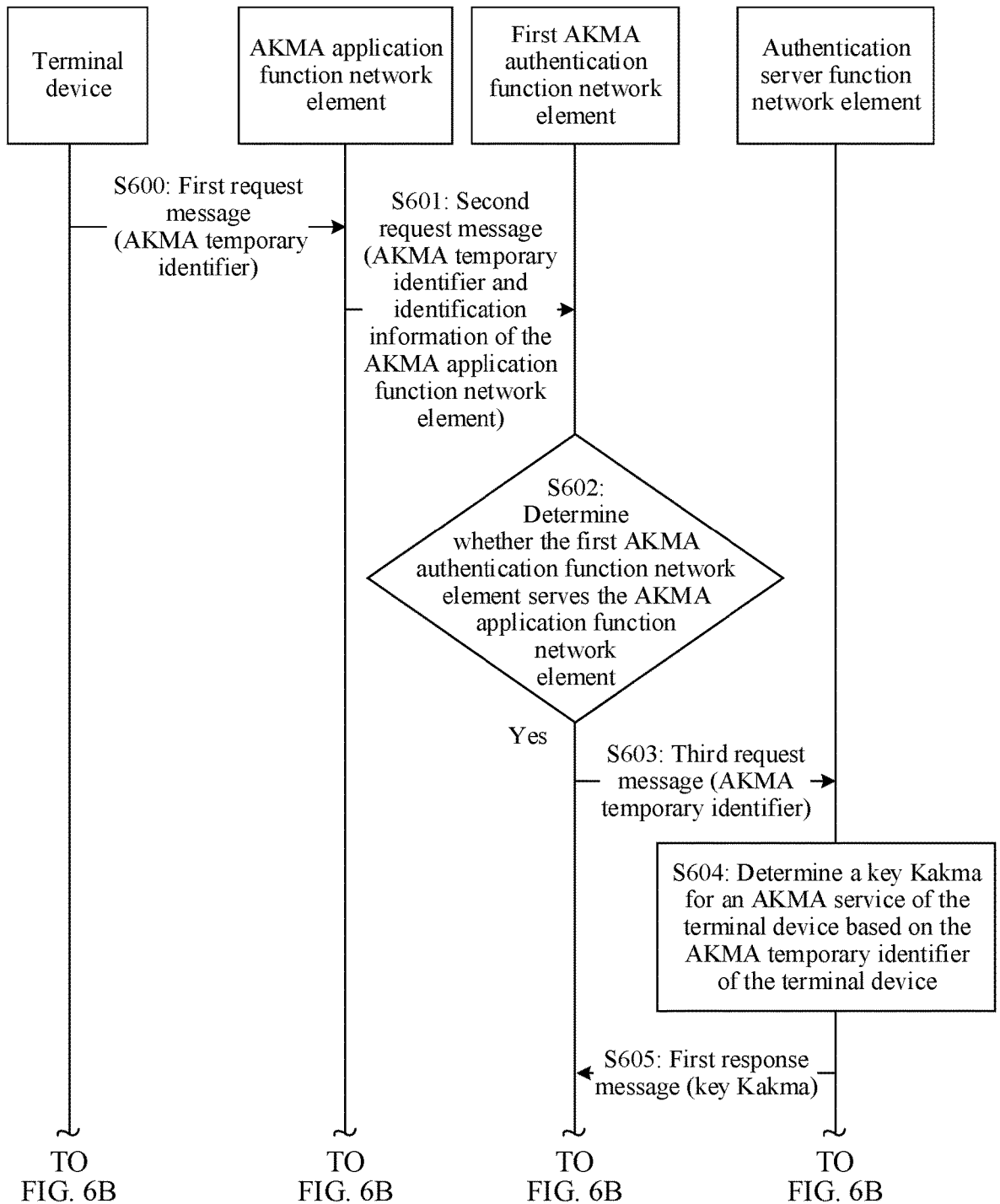
FIG. 6A and FIG. 6B are a schematic diagram of terminal device access according to an embodiment of this application.
Figure 6B:
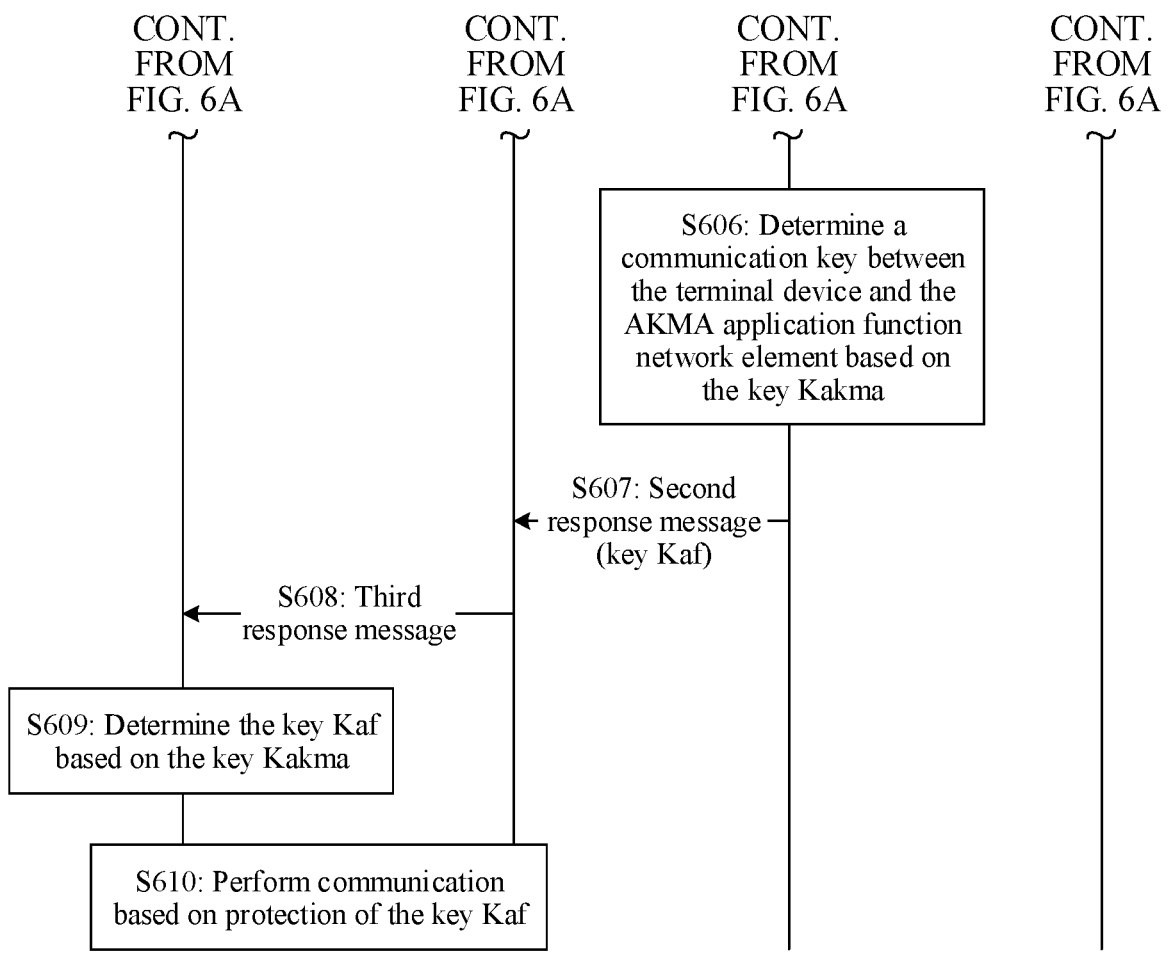

As shown in FIG. 6A and FIG. 6B, a procedure of a communication method is provided. In the procedure, a terminal device may be the terminal device in the architecture in FIG. 1, an AKMA application function network element may be the AKMA application function network element in the architecture in FIG. 1, a first AKMA authentication function network element may be the AKMA authentication function network element in the architecture in FIG. 1, and an authentication server function network element may be the authentication server function network element in the architecture in FIG. 1. The procedure includes the following steps.

S600: The terminal device sends a first request message to the AKMA application function network element, where the first request message carries an AKMA temporary identifier of the terminal device. Optionally, the first request message may be referred to as a request.

For example, the terminal device may initiate an access request to the AKMA application function network element by using a user plane. If the AKMA temporary identifier of the terminal device includes address information of the AKMA application function network element, the terminal device may determine, based on the address information of the AKMA application function network element, a to-be-accessed AKMA application function network element. If the AKMA temporary identifier of the terminal device does not include address information of the AKMA application function network element, or carried address information of the AKMA application function network element is a default value, the terminal device may select any AKMA application function network element based on a used application.

S601: The AKMA application function network element sends a second request message to the first AKMA authentication function network element, where the second request message carries an AKMA temporary identifier and identification information of the AKMA application function network element, and the second request message is used to request a communication key used when the terminal device communicates with the AKMA application function network element. Optionally, the second request message may be referred to as an application request (application request). It should be noted that the communication key may also be referred to as a key Kaf. In the following example, the key Kaf is used as an example for description.

In an embodiment of this application, the first AKMA authentication function network element may be by default. Therefore, the AKMA application function network element may directly send the second request message to the default first AKMA authentication function network element. Alternatively, the AKMA temporary identifier of the terminal device may include address information of the first AKMA authentication function network element, and the AKMA application function network element may determine the address information of the first AKMA authentication function network element based on the AKMA temporary identifier of the terminal device.

Optionally, in S602, the first AKMA authentication function network element determines whether the first AKMA authentication function network element serves the AKMA application function network element. If it is determined that the first AKMA authentication function network element serves the AKMA application function network element, the following step S603 is performed. If it is determined that the first AKMA authentication function network element does not serve the AKMA application function network element, AKMA authentication function network element redirection is performed. A process of performing AKMA authentication function network element redirection is described in detail in the following FIG. 7A and FIG. 7B.

For example, the first AKMA authentication function network element may determine location information of the AKMA application function network element based on the identification information of the AKMA application function network element, and determine, based on the location information of the AKMA application function network element, whether the AKMA application function network element is within a service range of the first AKMA authentication function network element. If the AKMA application function network element is within the service range of the first AKMA authentication function network element, it is considered that the first AKMA authentication function network element may serve the AKMA application function network element; otherwise, it is considered that the first AKMA authentication function network element cannot serve the AKMA application function network element.

It should be noted that this step is an optional step. The optional reason is that this step varies with a deployment scenario of an AKMA authentication function network element. If the AKMA authentication function network element is deployed at a same location as the authentication server function network element and the unified data management network element, that is, there is only one or a limited quantity of AKMA authentication function network elements in a carrier network, the AKMA authentication function network element may be selected by default according to a network management configuration. If the AKMA authentication function network element is deployed at a same location as the mobility management network element and an SMF, that is, there are many AKMA authentication function network elements in a carrier network, for example, one for each province, the AKMA authentication function network element may serve a neighboring mobility management network element and SMF by default, or the AKMA authentication function network element determines, based on content such as a location and subscription data of UE, whether to serve the UE. If the AKMA authentication function network element is deployed at a same location as a base station or an MEC server, there are numerous AKMA authentication function network elements in a network. In this case, selecting an appropriate AKMA authentication function network element is a mandatory step. A selection principle of the AKMA application function network element is the same as that of the foregoing AKMA authentication function network element.

It should be noted that, if the first AKMA authentication function network element has currently obtained a key Kakma of the terminal device, the first AKMA authentication function network element may directly perform the following step S606. If the first AKMA authentication function network element currently does not obtain the key Kakma of the terminal device, the following steps S603 to S606 may be performed between the first AKMA authentication function network element and the authentication server function network element.

Optionally, in S603, the first AKMA authentication function network element sends a third request message to the authentication server function network element, where the third request message carries the AKMA temporary identifier. Optionally, the third request message may further carry an identifier of the first AKMA authentication function network element, and the third request message may also be referred to as an AKMA key request or the like.

Optionally, in S604, the authentication server function network element determines a key Kakma for an AKMA service of the terminal device based on the AKMA temporary identifier of the terminal device. Specifically, the authentication server function network element may obtain a first key based on the AKMA temporary identifier, where the first key is an intermediate key in a primary authentication procedure. For example, the first key may be Kausf The authentication server function network element may generate the key Kakma for the AKMA service based on the first key. For example, in this embodiment of this application, in an AKMA authentication phase, after authentication on the terminal device succeeds, the authentication server function network element may store a correspondence between the AKMA temporary identifier, the first key, and an identifier of the terminal device. The authentication server function network element may obtain the first key and the like based on the AKMA temporary identifier and the correspondence. For example, in the correspondence between the AKMA temporary identifier, the first key, and the identifier of the terminal device, the identifier of the terminal device may specifically be an SUCI, an SUPI, or the like. This is not limited.

Optionally, in S605, the authentication server function network element sends a first response message to the first AKMA authentication function network element, where the first response message carries the key Kakma. Optionally, the first response message may also be referred to as an authentication response, or the like.

S606: The first AKMA authentication function network element determines the communication key between the terminal device and the AKMA application function network element based on the key Kakma. For ease of description, in the following example, the foregoing communication key is expressed as a key Kaf.

Optionally, the first AKMA authentication function network element determines the communication key between the terminal device and the AKMA application function network element based on the key Kakma and the identifier of the AKMA application function network element. The first AKMA authentication function network element may generate different communication keys for different AKMA application function network elements.

S607: The first AKMA authentication function network element sends a second response message to the AKMA application function network element, where the second response message carries the key Kaf.

Optionally, before S606, the method may further include: The AKMA application function network element sends a request message to the first AKMA authentication function network element. The request message is used to request the communication key, namely, Kaf, between the terminal device and the AKMA application server network element.

S608: The AKMA application function network element sends a third response message to the terminal device. Optionally, the third response message may carry the identifier of the AKMA application function network element. Optionally, the third response message may be a success message.

S609: The terminal device determines the key Kaf based on the key Kakma.

Optionally, the terminal device determines the key Kaf based on the identifier of the AKMA application function network element and the key Kakma.

S610: The terminal device communicates with the AKMA application function network element based on protection of the key Kaf. For example, when sending a first message to the AKMA application function network element, the terminal device may encrypt the first message by using the key Kaf. Similarly, when sending a second message to the terminal device, the AKMA application function network element may encrypt the second message by using the key Kaf.

Figure 7A:
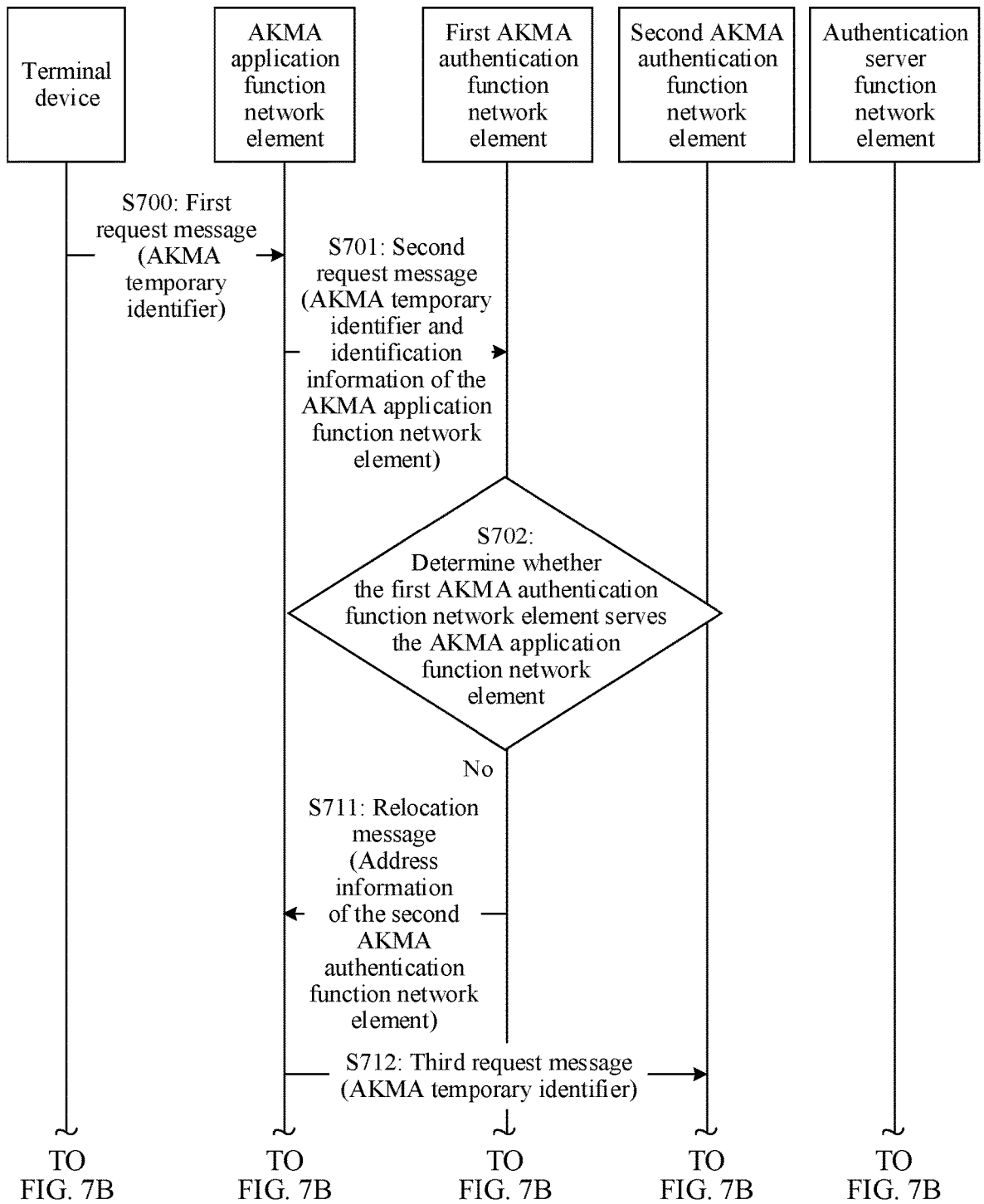
FIG. 7A and FIG. 7B are a schematic diagram of terminal device access according to an embodiment of this application.
Figure 7B:
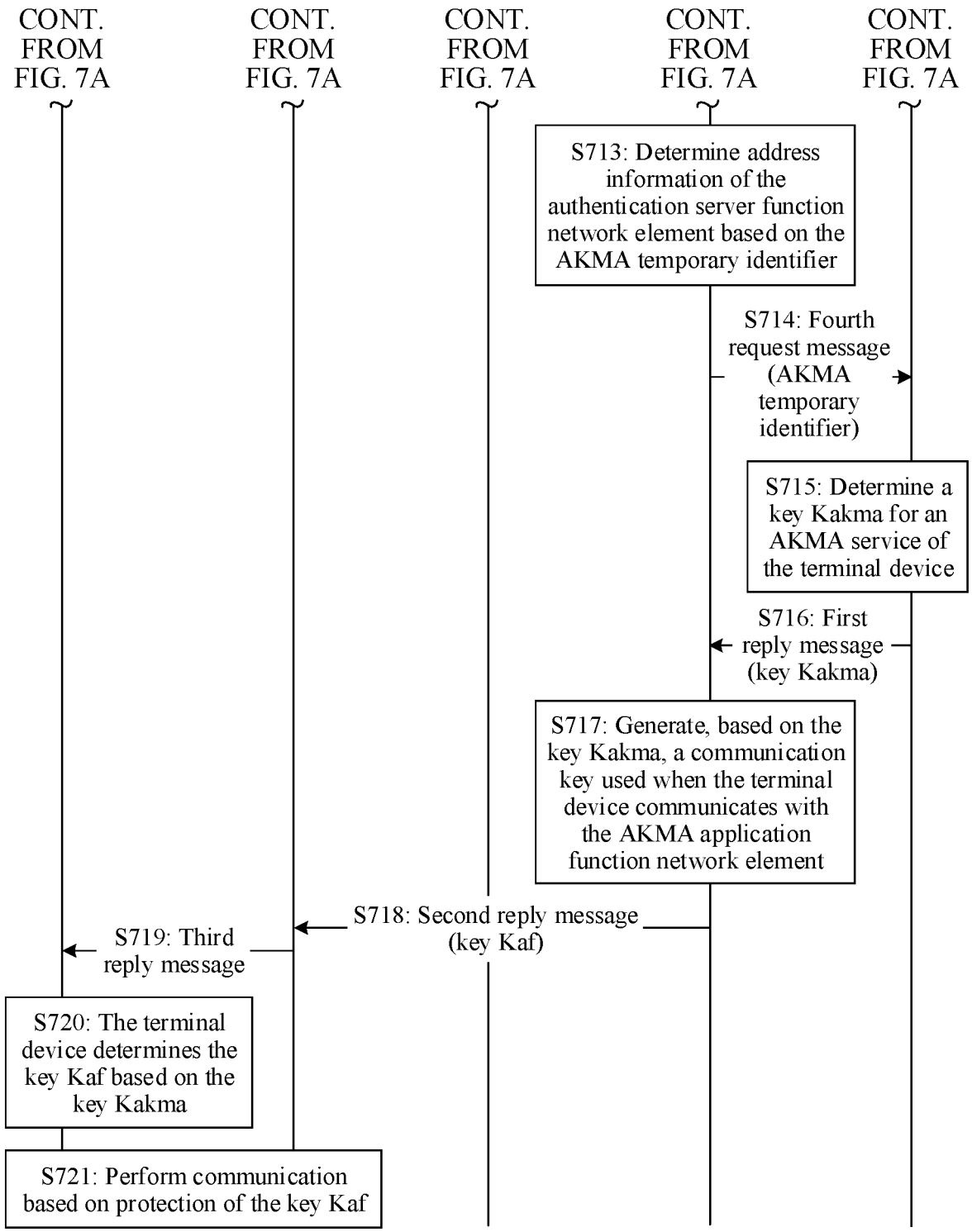

As shown in FIG. 7A and FIG. 7B, a procedure of a communication method is provided. In the procedure, a terminal device may be the terminal device in the architecture in FIG. 1, an AKMA application function network element may be the AKMA application function network element in the architecture in FIG. 1, a first AKMA authentication function network element and a second AKMA authentication function network element may be the AKMA authentication function network element in the architecture in FIG. 1, and an authentication server function network element may be the authentication server function network element in the architecture in FIG. 1. The procedure includes the following steps.

S700: The terminal device sends a first request message to the AKMA application function network element.

S701: The AKMA application function network element sends a second request message to the first AKMA authentication function network element.

S702: The first AKMA authentication function network element determines whether the first AKMA authentication function network element serves the AKMA application function network element. For example, the AKMA authentication function network element may determine, based on a preconfigured list or an identifier of the AKMA application function network element, whether a specific preset condition is met. For example, the AKMA authentication function network element determines, from the authentication server function network element, an NRF, and a network management system, whether to serve the AKMA application function network element. If the AKMA authentication function network element determines not to serve the AKMA application function network element, S711 is performed. If the AKMA authentication function network element determines to serve the AKMA application function network element, the method shown in FIG. 6A and FIG. 6B is performed.

For a specific implementation process of S700 to S702, refer to description in S600 to S602 in FIG. 6A. Details are not described herein again.

S711: The first AKMA authentication function network element sends a relocation message to the AKMA application function network element, where the relocation message carries address information of the second AKMA authentication function network element. The relocation may also be referred to as redirection. Relocation and redirection are not distinguished in an embodiment of this application unless otherwise specified.

For example, the first AKMA authentication function network element may select an appropriate AKMA authentication function network element based on the identifier of the AKMA application function network element carried in the second request message. The appropriate AKMA authentication function network element is the second AKMA authentication function network element. For example, the second AKMA authentication function network element may obtain the address information of the second AKMA authentication function network element based on the preconfigured list or by requesting another network element or network management system. Specifically, the first AKMA authentication function network element may send the identifier of the AKMA application function network element to the unified data management network element, to obtain location information of the terminal device. The first AKMA authentication function network element determines address information and the like of the second AKMA authentication function network element based on the location information of the terminal device.

S712: The AKMA application function network element sends a third request message to the second AKMA authentication function network element based on the address information of the second AKMA authentication function network element, where the third request message carries an AKMA temporary identifier of the terminal device. Optionally, the AKMA temporary identifier of the terminal device carried in the third request message may be an AKMA temporary identifier allocated to the terminal device in the manner shown in FIG. 3, FIG. 4A and FIG. 4B, or FIG. 5A and FIG. 5B. Alternatively, the AKMA temporary identifier of the terminal device carried in the third request information may be an updated AKMA temporary identifier of the first AKMA authentication function network element, or an updated AKMA temporary identifier of the AKMA authentication server function network element. This is not limited. Optionally, the third request message further includes the identifier of the AKMA application function network element, and the third request message may also be referred to as an application request (application request). If the third request message carries the address information of the second AKMA authentication function network element and the AKMA temporary identifier allocated to the terminal device in the manner shown in FIG. 3, FIG. 4A and FIG. 4B, or FIG. 5A and FIG. 5B. When the second AKMA authentication function network element learns that the address information of the second AKMA authentication function network element matches an original AKMA temporary identifier, the second AKMA authentication function network element determines that the third request message is a redirected message. Therefore, the second AKMA authentication function network element does not determine again whether to serve the AKMA application function network element.

S713: The second AKMA authentication function network element determines address information of the authentication server function network element based on the AKMA temporary identifier.

S714: The second AKMA authentication function network element sends a fourth request message to the authentication server function network element, where the fourth request message is used to request a key Kakma for an AKMA service corresponding to the terminal device, and the fourth request message includes the AKMA temporary identifier. Optionally, the fourth request message may further include the identifier of the second AKMA authentication function network element, and the fourth request message may also be referred to as an AKMA key request.

S715: The authentication server function network element determines a key Kakma for the AKMA service of the terminal device based on an identifier of the terminal device. For example, in this embodiment of this application, the authentication server function network element may obtain a first key based on the AKMA temporary identifier, where the first key is an intermediate key generated in the primary authentication procedure. The authentication server function network element generates the key Kakma for the AKMA service based on the first key. The authentication server function network element sends the Kakma to the AKMA authentication function network element. For example, after primary authentication on the terminal device succeeds, the authentication server function network element stores a correspondence between the AKMA temporary identifier, the identifier of the terminal device, and the first key, and the authentication server function network element obtains the first key based on the AKMA temporary identifier and the correspondence. For example, the first key may be Kausf.

S716: The authentication server function network element sends a first reply message to the second AKMA authentication function network element, where the first reply message carries the Kakma.

When the terminal device includes address information of an AKMA authentication function network element, the authentication server function network element may update the AKMA temporary identifier of the terminal device based on address information of the second AKMA authentication function network element. The terminal device can address only the first AKMA authentication function network element based on the original temporary identifier. After the AKMA temporary identifier of the terminal device is updated to the second AKMA authentication function network element, the terminal device may directly address the second AKMA authentication function network element based on an updated temporary identifier. Optionally, the first reply message may further include the updated AKMA temporary identifier of the terminal device. Alternatively, the foregoing process may be described as follows: When the AKMA temporary identifier includes address information of an AKMA authentication function network element, the authentication server function network element updates the address information of the AKMA authentication function network element in the AKMA temporary identifier from first address information to second address information. The first address information is the address information of the first AKMA authentication function network element, and the second address information is the address information of the second AKMA authentication function network element.

S717: The second AKMA authentication function network element generates, based on the key Kakma, a communication key used when the terminal device communicates with the AKMA application function network element, where the communication key may also be referred to as Kaf. For ease of description, the key Kaf may be used as an example for description in this embodiment of this application.

S718: The second AKMA authentication function network element sends a second reply message to the AKMA application function network element, where the second reply message carries the key Kaf. Optionally, the second reply message further includes validity time (validity time) of the key Kaf, and the second reply message may also be referred to as an application response (application response) or the like.

Optionally, before the foregoing S717, the method may further include: The AKMA application function network element sends a request message to the first AKMA authentication function network element. The request message is used to request the communication key, namely, Kaf, between the terminal device and the AKMA application server network element.

S719: The AKMA application function network element sends a third reply message to the terminal device. Optionally, the third reply message may also be referred to as a success message.

S720: The terminal device determines the key Kaf based on the key Kakma.

S721: The terminal device communicates with the AKMA application function network element based on protection of the key Kaf.

It should be noted that, in this embodiment of this application, for a redirection process, if the AKMA temporary identifier includes the address information of the AKMA authentication function network element, the AUSF may further update the first address information in the AKMA temporary identifier to the second address information. The first address information is the address information of the first AKMA authentication function network element, and the second address information is the address information of the second AKMA authentication function network element.

In the foregoing embodiments provided in this application, the methods provided in embodiments of this application are separately described from a perspective of a core network element, a terminal, and interaction between the core network element and the terminal. To implement the functions in the foregoing methods provided in embodiments of this application, the core network element and the terminal device may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions.

Figure 8:
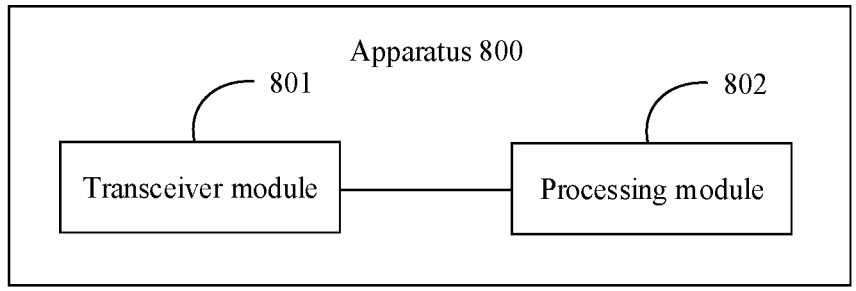
FIG. 8 to FIG. 11 each are a schematic diagram of a communication apparatus according to embodiments of this application.

Based on a same inventive idea as the method embodiments, an embodiment of this application further provides an apparatus 800, configured to perform the methods performed by the terminal device in the method embodiments shown in FIG. 3 to FIG. 7B. For related features, refer to the foregoing method embodiments. Details are not described herein again. As an example, as shown in FIG. 8, the apparatus 800 includes a transceiver module 801 and a processing module 802.

The transceiver module 801 is configured to: send a registration request message to a mobility management network element; and after authentication succeeds in a primary authentication procedure and non-access stratum NAS security protection is activated, receive a NAS-security-protected registration response sent by the mobility management network element. The registration response includes an authentication and key management for applications AKMA temporary identifier of the terminal device. The processing module 802 is configured to store the AKMA temporary identifier.

For specific functions of the transceiver module 801 and the processing module 802, refer to description in the foregoing method embodiments. Details are not described herein again.

Figure 9:
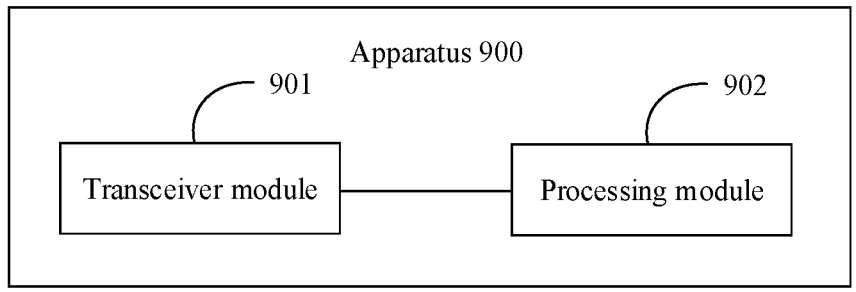

Based on a same inventive idea as the method embodiments, an embodiment of this application further provides an apparatus 900, configured to perform the methods performed by the authentication server function network element in the method embodiments shown in FIG. 3 to FIG. 7B. For related features, refer to the foregoing method embodiments. Details are not described herein again. As an example, as shown in FIG. 9, the apparatus 900 includes a transceiver module 901 and a processing module 902.

The transceiver module 901 is configured to receive, in a registration procedure of a terminal device, first indication information sent by a unified data management network element. The first indication information indicates that the terminal device supports an authentication and key management for applications AKMA service.

The processing module 902 is configured to determine an AKMA temporary identifier of the terminal device after primary authentication on the terminal device succeeds.

The transceiver module 901 is further configured to send the AKMA temporary identifier to the terminal device via a mobility management network element.

For specific functions of the transceiver module 901 and the processing module 902, refer to description in the foregoing method embodiments. Details are not described herein again.

Figure 10:
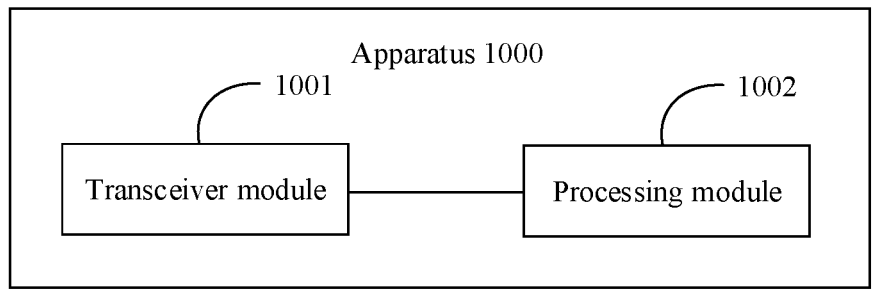

Based on a same inventive idea as the method embodiments, an embodiment of this application further provides an apparatus 1000, configured to perform the methods performed by the authentication server function network element in the method embodiments shown in FIG. 3 to FIG. 7B. For related features, refer to the foregoing method embodiments. Details are not described herein again. As an example, as shown in FIG. 10, the apparatus 1000 includes a transceiver module 1001 and a processing module 1002.

The transceiver module 1001 is configured to receive, in a registration procedure of a terminal device, a third request message sent by an authentication server function network element. The third request message includes an identifier of the terminal device.

The processing module 1002 is configured to determine, based on subscription data of the terminal device, that the terminal device supports an authentication and key management for applications AKMA service.

The transceiver module 1001 is further configured to send a third response message to the authentication server function network element. The third response message includes first indication information, and the first indication information indicates that the terminal device supports the AKMA service.

For specific functions of the transceiver module 1001 and the processing module 1002, refer to description in the foregoing method embodiments. Details are not described herein again.

Figure 11:
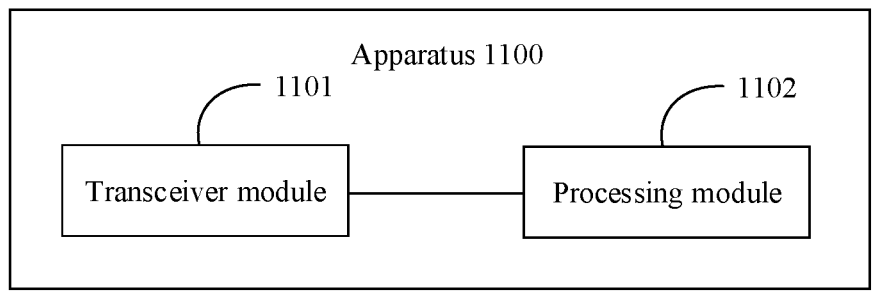

Based on a same inventive idea as the method embodiments, an embodiment of this application further provides an apparatus 1100, configured to perform the methods performed by the authentication server function network element in the method embodiments shown in FIG. 3 to FIG. 7B. For related features, refer to the foregoing method embodiments. Details are not described herein again. As an example, as shown in FIG. 11, the apparatus 1100 includes a transceiver module 1101 and a processing module 1102.

The transceiver module 1101 is configured to receive, in a registration procedure of a terminal device, a fourth request message sent by an authentication server function network element. The fourth request message is used to request an AKMA temporary identifier of the terminal device.

The processing module 1102 is configured to generate the AKMA temporary identifier.

The transceiver module 1101 is further configured to send a fourth response message to the authentication server function network element. The fourth response message carries the AKMA temporary identifier.

For specific functions of the transceiver module 1101 and the processing module 1102, refer to description in the foregoing method embodiments. Details are not described herein again. In embodiments of this application, division into the units is an example and is merely logical function division, and may be other division during actual implementation. In addition, functional units in embodiments of this application may be integrated into one processor, may exist alone physically, or two or more units may be integrated into one module. The foregoing integrated unit may be implemented in a form of hardware, or may be implemented in a form of a software functional module.

When the integrated unit is implemented in the form of a software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for instructing a terminal device (which may be a personal computer, a mobile phone, a network device, or the like) or a processor to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

In embodiments of this application, the terminal device, the authentication server function network element, the unified data management network element, and the AKMA authentication function network element may all be presented with the functional modules implemented through integration. The "module" herein may be a specific ASIC, a circuit, a processor executing one or more software or firmware programs, a memory, an integrated logic circuit, and/or another component that can provide the foregoing function.

Figure 12:
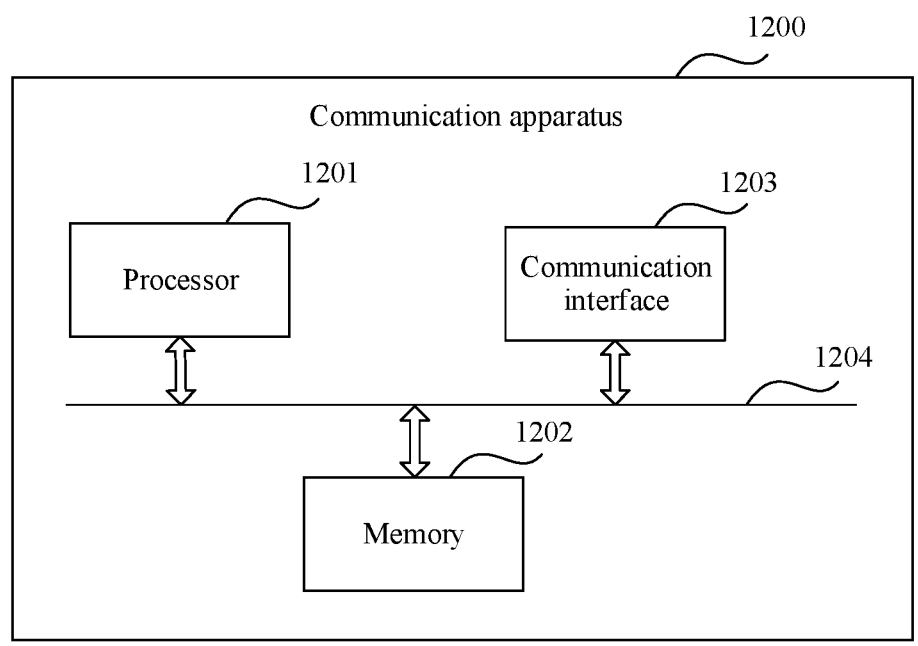
FIG. 12 is a schematic diagram of a structure of a communication apparatus according to an embodiment of this application.

In a simple embodiment, a communication apparatus 1200 shown in FIG. 12 includes at least one processor 1201, a memory 1202, and optionally, may further include a communication interface 1203.

The memory 1202 may be a volatile memory such as a random access memory. Alternatively, the memory may be a non-volatile memory for example, a read-only memory, a flash memory, a hard disk drive (HDD), or a solid-state drive (SSD). Alternatively, the memory 1202 is any other medium that can be used to carry or store expected program code in a form of instructions or a data structure and that can be accessed by a computer. However, this is not limited thereto. The memory 1202 may be a combination of the foregoing memories.

In this embodiment of this application, a specific connection medium between the processor 1201 and the memory 1202 is not limited. In this embodiment of this application, the memory 1202 is connected to the processor 1201 through a bus 1204 in the figure. The bus 1204 is indicated by a bold line in the figure. A mode of connection between other components is schematically described, and is not limited thereto. The bus 1204 may be classified into an address bus, a data bus, a control bus, or the like. For ease of representation, only one bold line indicates the bus in FIG. 12, but this does not mean that there is only one bus or only one type of bus.

The processor 1201 may have a data sending/receiving function, and can communicate with another device. In the apparatus shown in FIG. 12, an independent data transceiver module, for example, the communication interface 1203, may also be disposed and is configured to send/receive data. When communicating with another device, the processor 1201 may perform data transmission through the communication interface 1203.

In an example, when the terminal device uses the form shown in FIG. 12, the processor in FIG. 12 may invoke computer-executable instructions stored in the memory 1202, to enable the terminal device to perform the method performed by the terminal device in any one of the foregoing method embodiments.

Specifically, functions/implementation processes of the processing module and the transceiver module in FIG. 8 may be implemented by the processor 1201 in FIG. 12 invoking the computer-executable instructions stored in the memory 1202. Alternatively, functions/implementation processes of the processing module in FIG. 8 may be implemented by the processor 1201 in FIG. 12 invoking the computer-executable instructions stored in the memory 1202, and functions/implementation processes of the transceiver module in FIG. 8 may be implemented through the communication interface 1203 in FIG. 12.

In another example, when the authentication server function network element uses the form shown in FIG. 12, the processor in FIG. 12 may invoke the computer-executable instructions stored in the memory 1202, to enable the authentication server function to perform the method performed by the authentication server function in any one of the foregoing method embodiments.

Specifically, functions/implementation processes of the processing module and the transceiver module in FIG. 9 may be implemented by the processor 1201 in FIG. 12 invoking the computer-executable instructions stored in the memory 1202. Alternatively, functions/implementation processes of the processing module in FIG. 9 may be implemented by the processor 1201 in FIG. 12 invoking the computer-executable instructions stored in the memory 1202, and functions/implementation processes of the transceiver module in FIG. 9 may be implemented through the communication interface 1203 in FIG. 12.

In another example, when the unified data management network element uses the form shown in FIG. 12, the processor in FIG. 12 may invoke the computer-executable instructions stored in the memory 1202, to enable the unified data management network element to perform the method performed by the unified data management network element in any one of the foregoing method embodiments.

Specifically, functions/implementation processes of the processing module and the transceiver module in FIG. 10 may be implemented by the processor 1201 in FIG. 12 invoking the computer-executable instructions stored in the memory 1202. Alternatively, functions/implementation processes of the processing module in FIG. 10 may be implemented by the processor 1201 in FIG. 12 invoking the computer-executable instructions stored in the memory 1202, and functions/implementation of the transceiver module in FIG. 10 may be implemented through the communication interface 1203 in FIG. 12.

In another example, when the AKMA authentication function network element uses the form shown in FIG. 12, the processor in FIG. 12 may invoke the computer-executable instructions stored in the memory 1202, to enable the AKMA authentication function network element to perform the method performed by the AKMA authentication function network element in any one of the foregoing method embodiments.

Specifically, functions/implementation processes of the processing module and the transceiver module in FIG. 11 may be implemented by the processor 1201 in FIG. 12 invoking the computer-executable instructions stored in the memory 1202. Alternatively, functions/implementation processes of the processing module in FIG. 11 may be implemented by the processor 1201 in FIG. 12 invoking the computer-executable instructions stored in the memory 1202, and functions/implementation of the transceiver module in FIG. 11 may be implemented through the communication interface 1203 in FIG. 12.

An embodiment of this application further provides a communication system. The communication system may include at least one of an AKMA authentication function network element, a unified data management network element, an authentication server function network element, or an AKMA application function network element.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication system, comprising:
   an authentication server function network element, wherein the authentication server function network element comprises a first memory storing instructions and a first processor; and
   a unified data management network element, wherein the authentication server function network element comprises a second memory storing instructions and a second processor, wherein
   the authentication server function network element is configured to send a first request message to the unified data management network element in a registration procedure of a terminal device, wherein the first request message comprises an identifier of the terminal device;
   the unified data management network element is configured to: determine, based on subscription data of the terminal device, that the terminal device supports an authentication and key management for applications (AKMA) service; and send a first response message to the authentication server function network element, wherein the first response message comprises first indication information, and the first indication information indicates that the terminal device supports the AKMA service; and
   the authentication server function network element is further configured to: determine, based on the first indication information, an AKMA temporary identifier of the terminal device after primary authentication on the terminal device succeeds.

2. The system according to claim 1, wherein the AKMA temporary identifier comprises a home network identifier and a routing indicator, wherein the home network identifier indicates a home network of the terminal device, and the routing indicator is used to determine a network function entity generating a key (Kakma) for the AKMA service.

3. The system according to claim 2, wherein the AKMA temporary identifier further comprises at least one of address information of an AKMA authentication function network element or address information of an AKMA application function network element.

4. The system according to claim 1, wherein the first request message is a unified data management (UDM) service-based request message used for obtaining of an authentication vector, and the first response message is a UDM service-based response message used for obtaining of the authentication vector.

5. The system according to claim 1, wherein the communication system further comprises an AKMA application function network element, wherein the AKMA application function network element comprises a third memory storing instructions and a third processor and a first AKMA authentication function network element, wherein the AKMA authentication function network element comprises a fourth memory storing instructions and a fourth processor wherein
- the AKMA application function network element is configured to receive, from the terminal device, a second request message comprising the AKMA temporary identifier; and send a third request message to the AKMA authentication function network element, wherein the third request message carries the AKMA temporary identifier and an identifier of the AKMA application function network element; and
- the AKMA authentication function network element is configured to: when the AKMA authentication function network element can serve the AKMA application function network element, generate, based on a key (Kakma) for the AKMA service and the identifier of the AKMA application function network element, a communication key; wherein the key (Kakma) is obtained from the authentication server function network element; and send the communication key to the AKMA application function network element.

6. The system according to claim 5, wherein the AKMA authentication function network element is further configured to determine whether the AKMA authentication function network element serves the AKMA application function network element.

7. The system according to claim 5, wherein the authentication server function network element is further configured to:
- generate the Kakma based on a first key, wherein the first key is an intermediate key generated in a primary authentication on the terminal device, and
- send the Kakma to the AKMA authentication function network element.

8. The system according to claim 7, wherein the first key is an authentication server function network element key (Kausf).

9. A communication method, comprising:
- sending, by an authentication server function network element, a first request message to a unified data management network element in a registration procedure of a terminal device, wherein the first request message comprises an identifier of the terminal device;
- determining, by the unified data management network element based on subscription data of the terminal device, that the terminal device supports an authentication and key management for applications (AKMA) service;
- sending, by the unified data management network element to the authentication server function network element, a first response message comprising first indication information, wherein the first indication information indicates that the terminal device supports the AKMA service; and
- determining, by the authentication server function network element based on the first indication information, an AKMA temporary identifier of the terminal device after primary authentication on the terminal device succeeds.

10. The method according to claim 9, wherein the AKMA temporary identifier comprises a home network identifier and a routing indicator, wherein the home network identifier indicates a home network of the terminal device, and the routing indicator is used to determine a network function entity generating a key (Kakma) for the AKMA service.

11. The method according to claim 10, wherein the AKMA temporary identifier further comprises at least one of address information of an AKMA authentication function network element or address information of an AKMA application function network element.

12. The method according to claim 9, wherein the first request message is a unified data management (UDM) service-based request message used for obtaining of an authentication vector, and a third response message is a UDM service-based response message used for obtaining of the authentication vector.

13. The method according to claim 9, further comprising:
- receiving, by an AKMA application function network element from the terminal device, a second request message comprising the AKMA temporary identifier;
- sending, by the AKMA application function network element, a third request message to an AKMA authentication function network element, wherein the third request message carries the AKMA temporary identifier and an identifier of the AKMA application function network element;
- when the AKMA authentication function network element can serve the AKMA application function network element, generating, by the AKMA authentication function network element, a communication key based on a key (Kakma) for the AKMA service and the identifier and the identifier of the AKMA application function network element; wherein the key (Kakma) is obtained from the authentication server function network element; and
- sending, by the AKMA authentication function network element, the communication key to the AKMA application function network element.

14. The method according to claim 13, further comprising:
- determining, by the AKMA authentication function network element, whether the AKMA authentication function network element serves the AKMA application function network element.

15. The method according to claim 13, wherein generating, by the authentication server function network element, the Kakma based on a first key, wherein the first key is an intermediate key generated in a primary authentication on the terminal device.

16. The method according to claim 15, wherein the first key is an authentication server function network element key (Kausf).

17. A communication method, comprising:
- receiving, by a unified data management network element in a registration procedure of a terminal device, a first request message from an authentication server function network element, wherein the first request message comprises an identifier of the terminal device;
- determining, by the unified data management network element based on subscription data of the terminal device, that the terminal device supports an authentication and key management for applications (AKMA) service; and
- sending, by the unified data management network element to the authentication server function network element, a first response message comprising first indication information, wherein the first indication information indicates that the terminal device supports the AKMA service.

18. The method according to claim 17, wherein the first request message is a unified data management (UDM) service-based request message used for obtaining of an authentication vector, and the first response message is a UDM service-based response message used for obtaining of the authentication vector.

19. A communication apparatus, comprising:
- a processor, and a non-transitory memory, wherein the non-transitory memory is configured to store computer-executable instructions; and
- the processor is configured to execute the computer-executable instructions stored in the non-transitory memory, to enable the communication apparatus to:
- receive, in a registration procedure of a terminal device, a first request message from an authentication server function network element, wherein the first request message comprises an identifier of the terminal device;
- determine, based on subscription data of the terminal device, that the terminal device supports an authentication and key management for applications (AKMA) service; and
- send, to the authentication server function network element, a first response message comprising first indication information, wherein the first indication information indicates that the terminal device supports the AKMA service.

20. The communication apparatus according to claim 19, wherein the first request message is a unified data management (UDM) service-based request message used for obtaining of an authentication vector, and the first response message is a UDM service-based response message used for obtaining of the authentication vector.

* * * * *